(12) United States Patent
Funatsu et al.

(10) Patent No.: US 9,344,761 B2
(45) Date of Patent: May 17, 2016

(54) VIDEO DISPLAY SYSTEM, EXTERNAL UNIT, AND METHOD OF DISPLAYING VIDEO

(71) Applicant: JOLED Inc., Tokyo (JP)

(72) Inventors: Yohei Funatsu, Kanagawa (JP); Koichi Maeyama, Kanagawa (JP); Daisuke Miki, Tokyo (JP); Yoshito Shiraishi, Kanagawa (JP); Shoji Araki, Kanagawa (JP)

(73) Assignee: JOLED Inc., Tokyo (JP)

( * ) Notice: Subject to any disclaimer, the term of this patent is extended or adjusted under 35 U.S.C. 154(b) by 0 days.

(21) Appl. No.: 14/497,931

(22) Filed: Sep. 26, 2014

(65) Prior Publication Data

US 2015/0106844 A1 Apr. 16, 2015

(30) Foreign Application Priority Data

Oct. 16, 2013 (JP) ................................. 2013-215696

(51) Int. Cl.

| | |
|---|---|
| *H04N 21/45* | (2011.01) |
| *H04N 21/80* | (2011.01) |
| *H04N 21/81* | (2011.01) |
| *H04N 21/4223* | (2011.01) |
| *H04N 21/422* | (2011.01) |
| *H04N 21/41* | (2011.01) |
| *H04N 21/431* | (2011.01) |

(52) U.S. Cl.
CPC ....... *H04N 21/4532* (2013.01); *H04N 21/4122* (2013.01); *H04N 21/422* (2013.01); *H04N 21/4223* (2013.01); *H04N 21/42202* (2013.01); *H04N 21/4318* (2013.01); *H04N 21/80* (2013.01); *H04N 21/81* (2013.01); *H04N 21/8126* (2013.01)

(58) Field of Classification Search
None
See application file for complete search history.

(56) References Cited

U.S. PATENT DOCUMENTS

| | | | | |
|---|---|---|---|---|
| 2004/0221043 A1* | 11/2004 | Su | ............................ | H04L 12/18 709/227 |
| 2010/0225663 A1* | 9/2010 | Lee | ....................... | G09G 3/2003 345/596 |
| 2012/0162166 A1* | 6/2012 | Lin | .......................... | G09G 3/20 345/207 |

FOREIGN PATENT DOCUMENTS

JP 2010-060863 3/2010

* cited by examiner

*Primary Examiner* — Justin Shepard
(74) *Attorney, Agent, or Firm* — Michael Best & Friedrich LLP

(57) ABSTRACT

A video display system includes a video display unit, and an external unit configured to be communicatable with the video display unit. The video display unit includes a display panel and is configured to transmit specific information to the external unit. The specific information includes display panel information related to the display panel. The external unit is configured to derive a parameter from the specific information received from the video display unit and to transmit, to the video display unit, one of the derived parameter and related data related to the derived parameter. The parameter determines image quality.

6 Claims, 22 Drawing Sheets

VIDEO DISPLAY SYSTEM, EXTERNAL UNIT, AND METHOD OF DISPLAYING VIDEO

CROSS REFERENCE TO RELATED APPLICATIONS

This application claims the benefit of Japanese Priority Patent Application JP 2013-215696 filed Oct. 16, 2013, the entire contents of which are incorporated herein by reference.

BACKGROUND

The present technology relates to a video display system and a method of displaying a video that utilize a network, and to an external unit that is utilized in the video display system.

In recent years, a video display unit such as a television has been gaining higher image quality and multiple functions. The image quality of the video display unit is determined based on various parameters. These parameters are often preset when the video display unit is shipped. When a display panel therein is aged, the video display unit may be provided, for example, with a function of automatically correcting part of the preset parameters to values in accordance with the aging in some cases. Moreover, it is assumed that video contents displayed by the video display unit may include various kinds and various programs. The video display unit may be therefore provided, for example, with a function of automatically correcting part of the preset parameters to values in accordance with the kinds and the like of the video contents in some cases (for example, see Japanese Unexamined Patent Application Publication No. 2010-60863).

SUMMARY

In order to perform the above-described correction, it is often necessary to use a high-performance processor. In this case, there has been an issue of increase in manufacturing cost.

It is desirable to provide a video display system, an external unit, and a method of displaying a video that are capable of achieving a video having appropriate image quality while suppressing increase in manufacturing cost.

According to an embodiment of the present technology, there is provided a video display system including a video display unit, and an external unit configured to be communicatable with the video display unit. The video display unit includes a display panel and is configured to transmit specific information to the external unit. The specific information includes display panel information related to the display panel. The external unit is configured to derive a parameter from the specific information received from the video display unit and to transmit, to the video display unit, one of the derived parameter and related data related to the derived parameter. The parameter determines image quality.

In the video display system according to the embodiment of the present technology, the parameter determining the image quality is derived from the specific information received from the video display unit, and one of the derived parameter and the related data related to the parameter is transmitted to the video display unit. This causes the external unit to perform the information process, which puts a load thereon, necessary for achieving a video having appropriate image quality.

According to an embodiment of the present technology, there is provided an external unit including:

(A1) a receiving section configured to receive specific information from a video display unit, the video display unit including a display panel, and the specific information including display panel information related to the display panel;

(A2) an arithmetic section configured to derive one of a parameter and related data related to the parameter from the specific information received by the receiving section, the parameter determining image quality; and (A3) a transmitting section configured to transmit, to the video display unit, one of the parameter and the related data derived by the arithmetic section.

In the external unit according to the embodiment of the present technology, the parameter determining the image quality is derived from the specific information received from the video display unit, and one of the derived parameter and the related data related to the parameter is transmitted to the video display unit. This causes the external unit to perform the information process, which puts a load thereon, necessary for achieving a video having appropriate image quality.

According to an embodiment of the present technology, there is provided a method of displaying a video, the method including (B1) receiving specific information from a video display unit, deriving one of a parameter and related data related to the parameter from the received specific information, and transmitting, to the video display unit, one of the derived parameter and the related data, the video display unit including a display panel, the specific information including display panel information related to the display panel, and the parameter determining image quality.

In the method of displaying a video according to the embodiment of the present technology, the parameter determining the image quality is derived from the specific information received from the video display unit, and one of the derived parameter and the related data related to the parameter is transmitted to the video display unit. This causes the external unit to perform the information process, which puts a load thereon, necessary for achieving a video having appropriate image quality.

According to the video display system, the external unit, and the method of displaying a video according to the embodiments of the present technology, it is possible to cause the external unit to perform the information process, which puts a load thereon, necessary for achieving a video having appropriate image quality. As a result, it is possible to achieve a video having appropriate image quality while suppressing increase in manufacturing cost of the video display unit.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
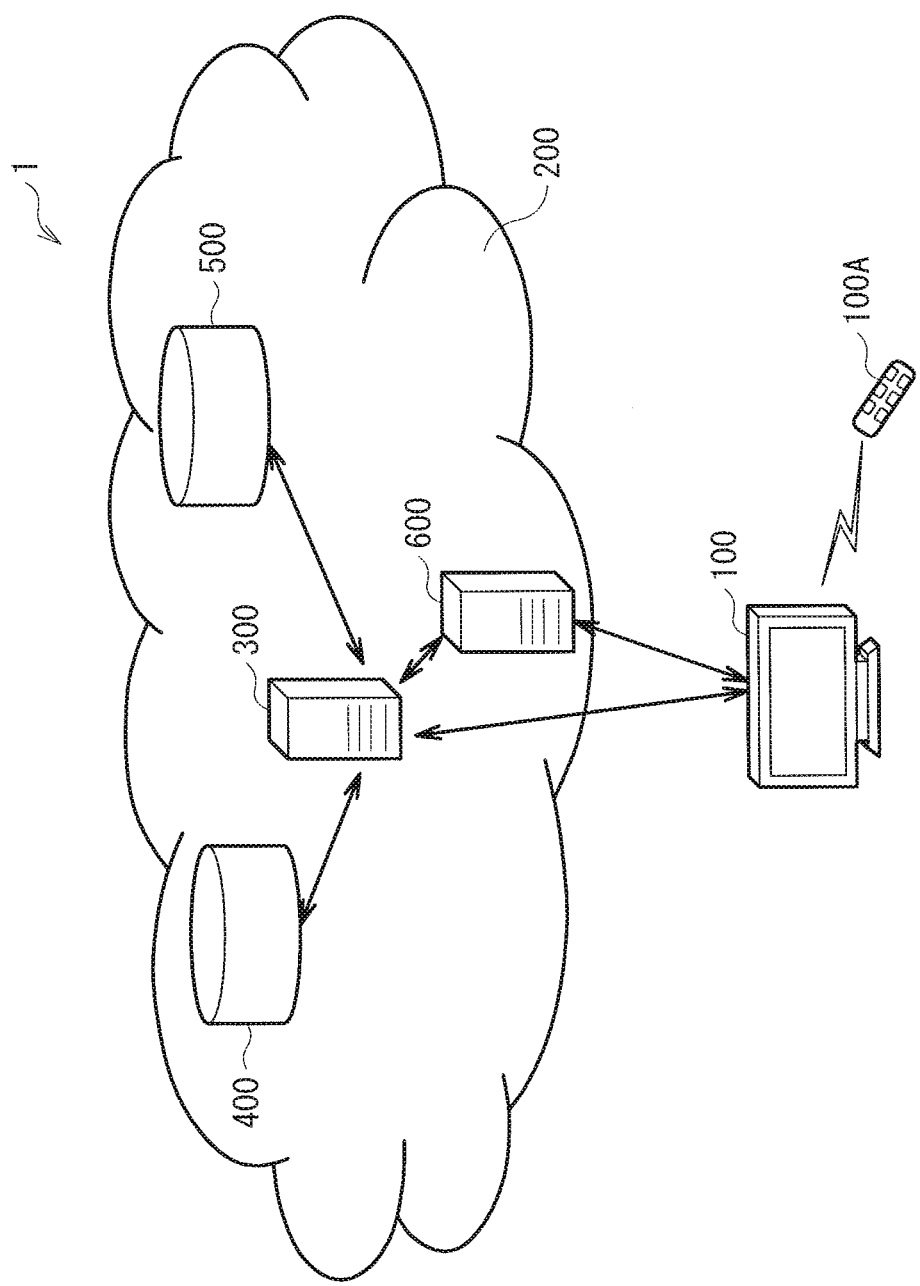
FIG. 1 is a diagram illustrating an example of a schematic configuration of a video display system according to a first embodiment of the present technology.

Some embodiments of the present technology are described below in detail with reference to the drawings. The description is provided in the following order.
1. First Embodiment (Video Display System)
  An example in which content is acquired from a network
2. Modification of First Embodiment
  An example in which specific information is transmitted from a panel module to outside
3. Second Embodiment (Video Display System)
  An example in which content is acquired from a broadcast station
4. Modification of Second Embodiment
  An example in which specific information is transmitted from a panel module to outside
5. Third Embodiment (Video Display System)
  An example in which content is acquired from a network and a broadcast station
6. Fourth Embodiment (Video Display System)
  An example in which a set top box is used
7. Modification Common to Embodiments (Video Display System)
  An example in which an imaging unit is connected to a network 1. First Embodiment Configuration FIG. 1 illustrates an example of a schematic configuration of a video display system 1 according to a first embodiment of the present technology. The video display system 1 may include, for example, a video display unit 100, an information processing unit 300, a content storage unit 400, a data storage unit 500, and a distribution server 600. The video display unit 100 and the information processing unit 300 may be connected to a network 200. The content storage unit 400 and the data storage unit 500 may be connected to the network 200 via the information processing unit 300.

[Network 200]

The network 200 may be, for example, a network communicating with the use of a communication protocol (TCP/IP) which is utilized for the Internet as a standard, or a secure network communicating with the use of a communication protocol unique to the network. Examples of the network 200 may include the Internet, an intranet, and a local area network. The network 200 may be connected to the information processing unit 300, the content storage unit 400, the data storage unit 500, or the distribution server 600, for example, by a wired LAN (Local Area Network), by a wireless LAN, or by a telephone line. Examples of the wired LAN may include Ethernet (registered trademark), and examples of the wireless LAN may include Wi-Fi.

[Video Display Unit 100]

The video display unit 100 may operate, for example, in response to a predetermined signal supplied from buttons arranged on a predetermined operation panel, from a controller 100A provided with operation buttons, or the like. For example, the controller 100A may wirelessly transmit a predetermined operation signal in response to an operation of the user, for example, with the use of infrared rays. The video display unit 100 may acquire the operation signal and perform a predetermined operation. The video display unit 100 is configured to be communicatable with the information processing unit 300, the distribution server 600, etc. via the network 200.

Figure 2:
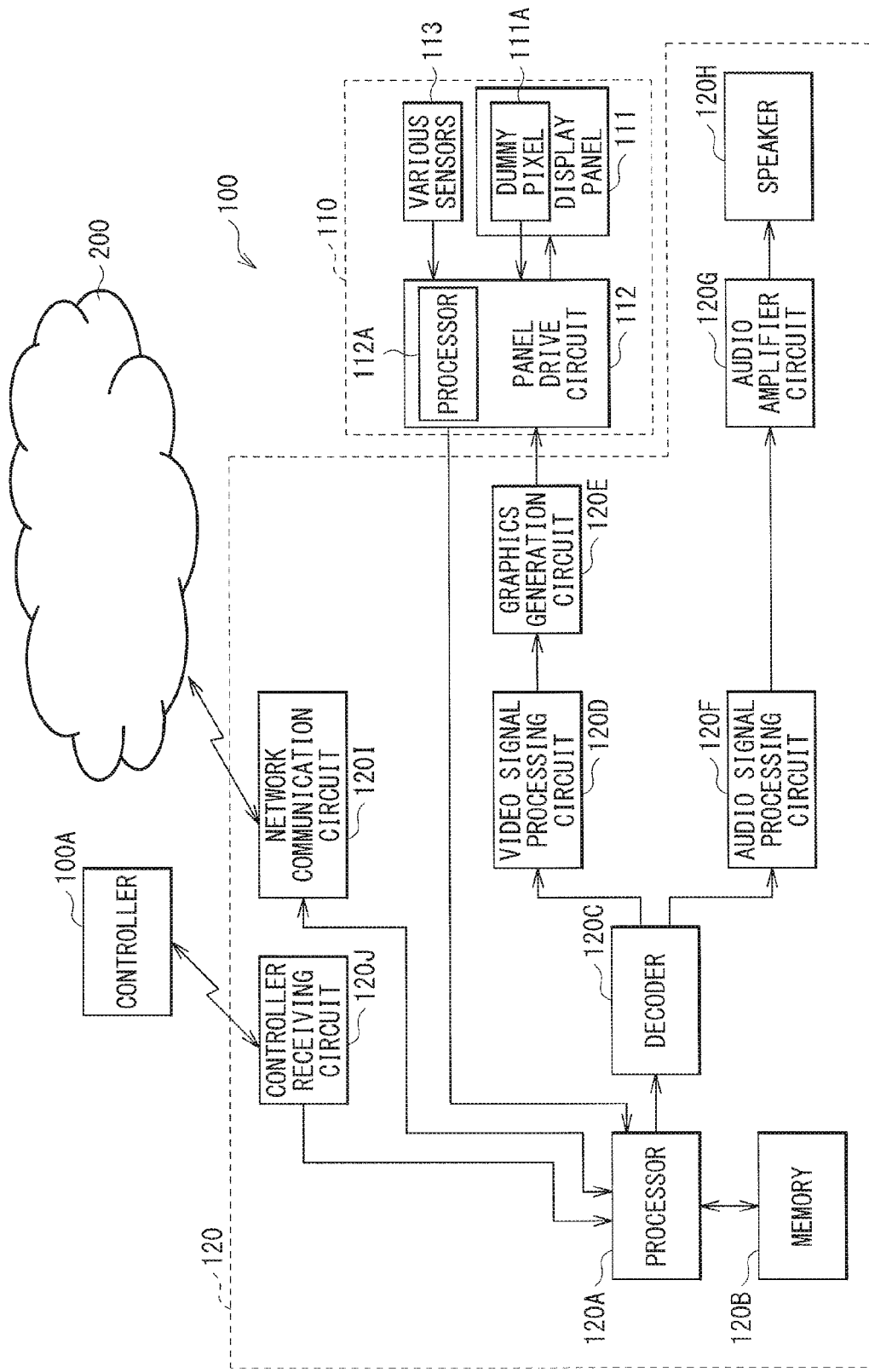
FIG. 2 is a diagram illustrating an example of an inner configuration of the video display unit illustrated in FIG. 1.
Figure 3:
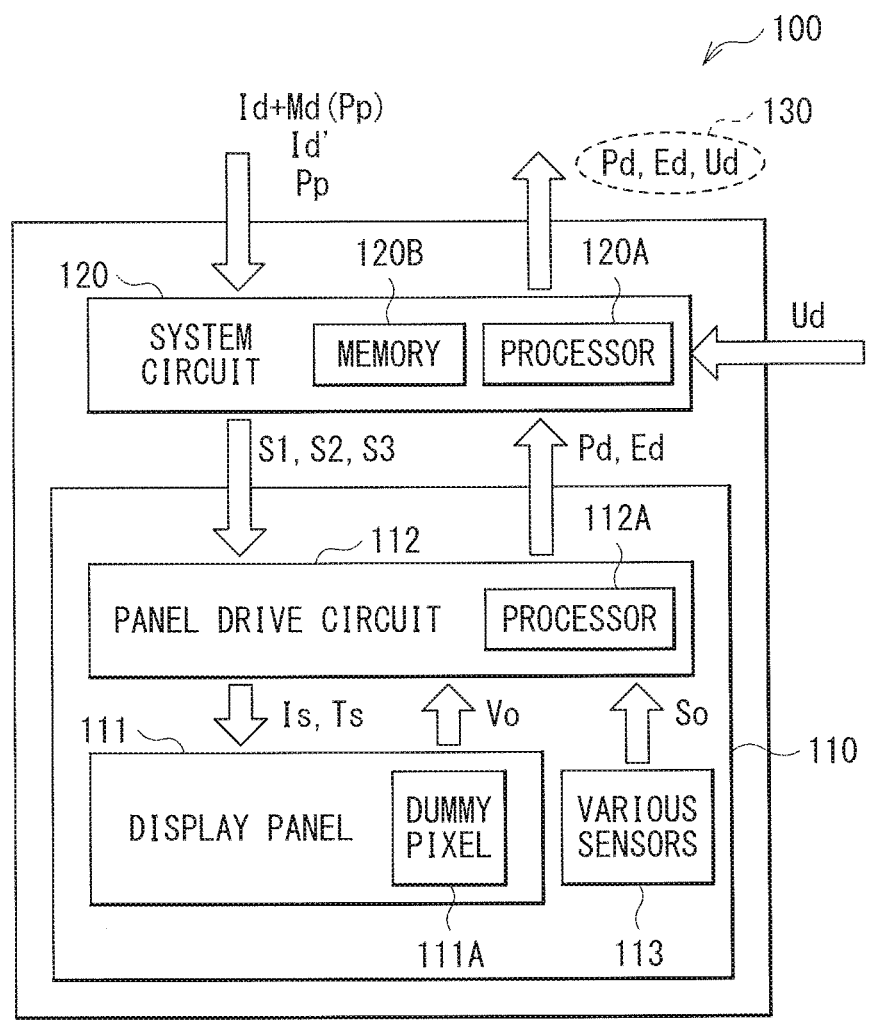
FIG. 3 is a diagram illustrating an example of a flow of data in the video display unit illustrated in FIG. 2.
Figure 4:
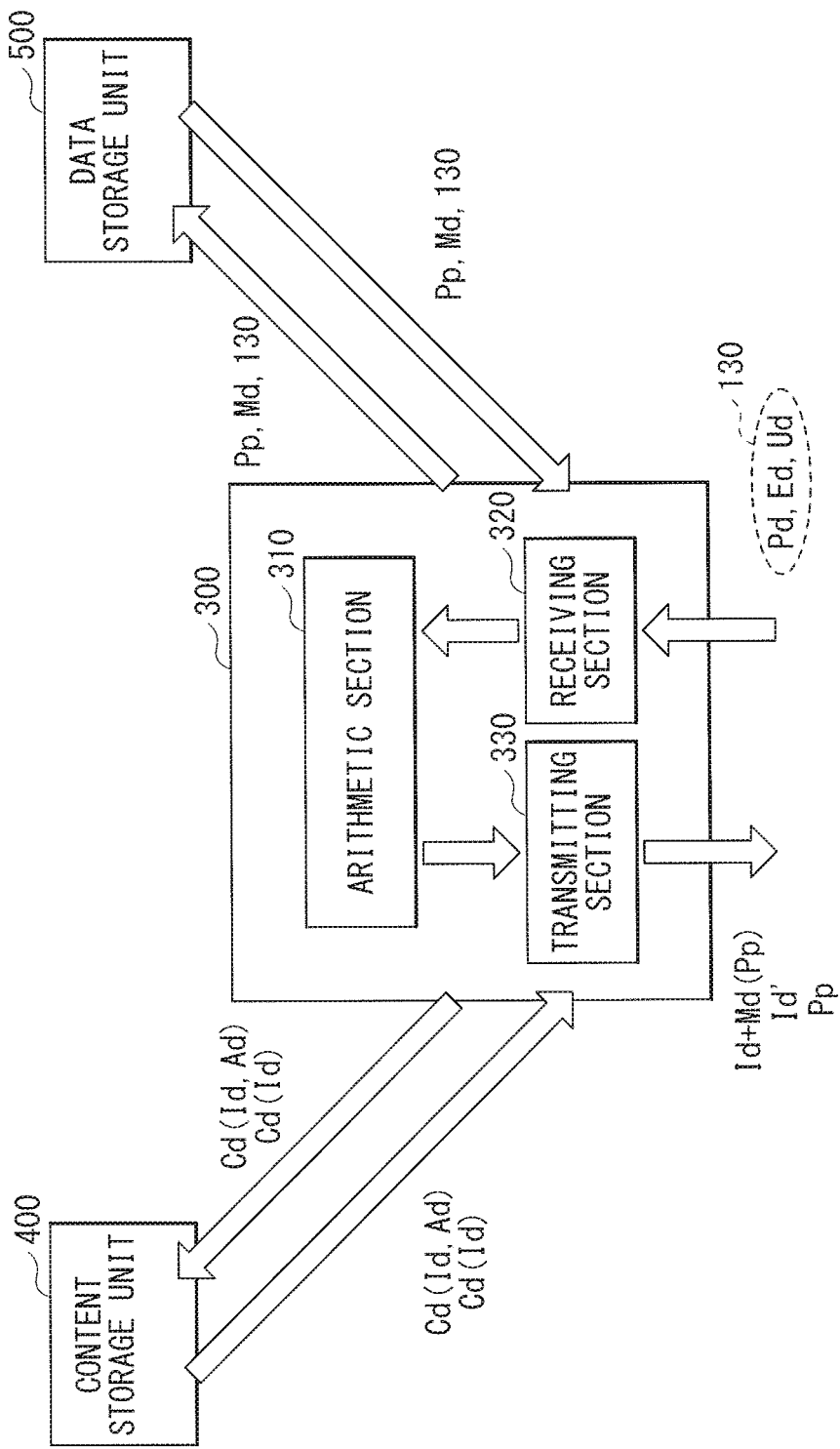
FIG. 4 is a diagram illustrating an example of a flow of data between an information processing unit, a content storage unit, and a data storage unit illustrated in FIG. 1.

FIG. 2 illustrates an example of an inner configuration of the video display unit 100. FIG. 3 illustrates an example of a flow of data in the video display unit 100. The video display unit 100 may include a panel module 110 and a system circuit 120. The panel module 110 may include a display panel 111 and a panel drive circuit 112. The video display unit 100 may include a sensor that is allowed to detect one or more of electric characteristics, optical characteristics, and environment of the display panel 111. Specifically, the panel module 110 may include various sensors 113.

The display panel 111 includes a plurality of display pixels that are arranged two-dimensionally. The display panel 111 displays a video when the respective display pixels are driven in response to a video signal. The display panel 111 may be, for example, an organic electroluminescence display (OELD) or a liquid crystal display (LCD). The display panel 111 may include, for example, a dummy pixel 111A that has no contribution to the display operation in a non-display region (for example, in a frame region). The dummy pixel 111A is for acquiring information (display panel information Pd) related to the display panel 111. The dummy pixel 111A may have, for example, a configuration same as that of the display pixel. For example, a voltage corresponding to white luminance may be applied to the dummy pixel 111A during a period in which the display pixels are driven in response to the video signal. At this time, it is possible to predict degradation in the display pixel, for example, by converting a current flowing in the dummy pixel 111A into a voltage and measuring a voltage Vo obtained by this conversion. In other words, the dummy pixel 111A is a sensor that is allowed to detect the electric characteristics of the display panel 111.

As with the dummy pixel 111A, the various sensors 113 are for acquiring information (display panel information Pd) related to the display panel 111. The various sensors 113 may be also for acquiring environment information (environment information Ed) that has no direct relation with the display panel 111. Examples of the various sensors 113 may include an image sensor, an infrared ray sensor, a temperature sensor, a humidity sensor, an illumination sensor, a luminance sensor, a current sensor, a voltage sensor, an acceleration sensor, a pressure sensor, and a tactile sensor.

The panel drive circuit 112 drives the display panel 111 based on a video signal S1, an image quality setting signal S2, and a display panel control signal S3 (which are described later) of each of the display pixels that are inputted from the system circuit 120. The panel drive circuit 112 drives the display panel 111 based on a video signal Is and a control signal Ts generated from the image quality setting signal S2 and the display panel control signal S3. The panel drive circuit 112 may include, for example, a controller, a conversion circuit, a vertical drive circuit, and a horizontal drive circuit. The controller is a circuit that supplies a control signal to each of the conversion circuit, the horizontal drive circuit, and the vertical drive circuit, based on the control signal Ts, and to control those circuits to operate in synchronization with one another. The conversion circuit converts the video signal Is synchronized with the control signal Ts into the video signal Is suitable for driving the display panel 111. The vertical drive circuit generates, based on the control signal and an address signal, a scanning line signal that includes a scanning pulse for selecting the respective display pixels on a row unit basis, and outputs the generated scanning line signal to the display pixel via a scanning line. The horizontal drive circuit generates, based on the control signal Ts and the video signal Is, a data line signal that includes gradation data of each of the display pixels, and outputs the generated data line signal to the display pixel via a data line.

By using the image quality setting signal S2 and the display panel control signal S3, for example, the following panel control operations may be achieved.

(1) Image Quality Adjustment

Luminance adjustment, chromaticity adjustment, gamma adjustment, and spatial and temporal adaptation processes thereof "Spatial" described above may refer, for example, to a panel in-plane position.

"Temporal" described above may refer, for example, to a panel lighting time.

Resolution conversion, frequency conversion, moving image quality improvement process, noise reduction process, conversion into 3D video, and geometric conversion on video (aspect ratio conversion, panorama conversion, division into a plurality of images, combining of a plurality of videos, etc.)

(2) Display Device Correction

Luminance correction, chromaticity correction, gamma correction, spatial and temporal adaptation processes thereof, and adaptation processes on panel temperature and panel drive state thereof "Spatial" described above may refer, for example, to a panel in-plane position.

"Temporal" described above may refer, for example, to a panel lighting time.

(3) Display Device Protection

Panel current protection function (such as ABL), control function for panel light emission luminance, and protection function against panel degradation and burning (4) Display Device Consumed Power Reduction Panel drive voltage control, panel drive frequency control, and panel drive timing control The panel drive circuit 112 also has a function of acquiring the voltage Vo obtained from the dummy pixel 111A, an output So of the various sensors 113, etc. and generating the display panel information Pd, the environment information Ed, etc. based thereon. In the panel drive circuit 112, for example, the function of generating the display panel information Pd, the environment information Ed, etc. is achieved by a processor 112A. The panel drive circuit 112 outputs the generated display panel information Pd and the generated environment information Ed to the system circuit 120.

Examples of the display panel information Pd may include the followings.

(1) Panel ID
(2) Screen size, screen resolution, aspect ratio, and curvature
(3) Panel surface temperature, and panel control substrate temperature
(4) Panel stress
(5) Viewing angle characteristics, outside light reflection characteristics, and characteristics of an optical device used in combination
(6) Drive frequency, drive voltage, and drive timing
(7) Panel display performance (luminance, chromaticity, contrast, gamma characteristics, etc.)
(8) Spatial and temporal variation components of the above-mentioned panel display performance
(9) Signal history of displayed video Examples of the environment information Ed may include the followings.

(1) Illuminance of outside light
(2) Color temperature of outside light
(3) Incidence direction of outside light
(4) Viewing position, line-of-sight direction, posture, viewer number, and viewer person of user
(5) Environment temperature and humidity
(6) Spatial position of display unit (slope, etc.)
(7) Positional relationship with respective display units upon multiple-screen display The system circuit 120 decodes content data acquired from outside (for example, video content data Id and metadata Md, or processed content data Id'), then performs an image process thereon, and outputs the processed data to the panel drive circuit 112. The decoding process may be performed, for example, with the use of an appropriate codec compatible with encoding of the video processing unit 300. By the decoding process, the video signal S1 of each of the display pixels is generated, and the image quality setting signal S2 and the display panel control signal S3 are generated based on what is written in a metadata Md region or in metadata Md in another file. The image quality setting signal S2 and the display panel control signal S3 are inputted to the processor 112A that controls the display panel 111, which allows a desired panel control operation to be performed.

The system circuit 120 may include, for example, a processor 120A, a memory 120B, a decoder 120C, a video signal processing circuit 120D, a graphics generation circuit 120E, an audio signal processing circuit 120F, an audio amplifier circuit 120G, and a speaker 120H. The system circuit 120 may further include, for example, a network communication circuit 120I and a controller receiving circuit 120J. The video display unit 100 may include, for example, the controller 100A as a member separated from the panel module 110, the system circuit 120, etc.

The video content data Id is a concept that includes not only a moving image but also a still image, and further includes an audio. Examples of the video content may include a video of a program or a video of a commercial broadcasted by a broadcast station, a video broadcasted by wired broadcasting, a video recorded in a predetermined recording medium and reproduced by a reproducing unit, and a video reproduced by a game machine, an information processing unit, etc. The processed content data Id' may be, for example, video data obtained by processing the video content data Id with the use of a later-described parameter Pp derived from later-described specific information 130. When the content attribute data Ad has been originally attached to the video content data Id, the processed content data Id' may be, for example, video data obtained by processing the video content data Id with the use of at least the parameter Pp out of the parameter Pp and the content attribute data Ad. The metadata Md may include, for example, at least the parameter Pp out of the parameter Pp and the content attribute data Ad. The metadata Md includes at least a control value of the display panel 111, and includes a value (for example, an image quality setting value) other than the control value of the display panel 111 depending on information included in the parameter Pp and the content attribute data Ad. The metadata Md may be data in a file including the video content data Id, or may be data in a file different from that including the video content data Id.

The content attribute data Ad is additional data of the video content data Id and describes what is in the video content data Id. Examples of the content attribute data Ad may include the followings.
(1) Producer of the video content data Id
(2) Production date and time of the video content data Id
(3) Kind (genre) of the video content data Id
(4) Recommended image quality of the video content data Id
(5) Resolution and frequency of the video content data Id
(6) Codec used for encoding the content
In a case where the video content data Id is a video shot by an imaging unit
(7) Manufacturer of camera, item number of camera, and item number of lens
(8) F-number, exposure time, ISO speed, exposure correction, focal length, maximum aperture stop, sidelight mode, subject distance, presence or absence of flash, light amount of flash, and shooting angle of view
(9) Illumination upon shooting, color temperature of illumination, and luminance upon subject reflectance of 100%

The processor 120A controls an operation of each of sections in the system circuit 120. The processor 120A may set, for example, a control signal to be inputted to the video signal processing circuit 120D based on setting information stored in the memory 120B or setting information (for example, the metadata Md) inputted from the network communication circuit 120I. The memory 120B may store the setting information of the video display unit 100 and performs data management. The memory 120B may be allowed, for example, to store setting information (for example, the metadata Md) such as a display method.

The decoder 120C may obtain video data, for example, by performing a decoding process on a video PES (Packetized Elementary Stream) packet included in the content data inputted from the outside. Also, the decoder 120C may obtain audio data, for example, by performing a decoding process on an audio PES packet included in the content data inputted from the outside. The video signal processing circuit 120D and the graphics generation circuit 120E may perform, for example, a multiple image process, an overlapping process of graphics data, etc. as necessary on the video data obtained by the decoder 120C. The graphics generation circuit 120E outputs, to the panel module 110, video data (for example, video data obtained from the video content data Id or the processed content data Id') after the predetermined process and the setting information (for example, the metadata Md).

The audio signal processing circuit 120F may perform, for example, a process such as D-A conversion on the audio data obtained by the decoder 120C. The audio amplifier circuit 120G may amplify the audio signal outputted from the audio signal processing circuit 120F and supply the amplified audio signal to the speaker 120H, for example. The network communication circuit 120I communicates with the units (specifically, the information processing unit 300, the distribution server 600, etc.) on the network 200. The controller receiving circuit 120J may receive a remote control signal (for example, user information Ud) transmitted from the controller 100A and supply the received remote control signal to the processor 120A, for example. The processor 120A may control each of the sections in the video display unit 100 in accordance with the remote control signal, for example.

The user information Ud may include, for example, user attribute information, user preference information, and user operation information. Examples of the user attribute information may include the followings.
(1) Age, sex, nationality of the user
(2) Family composition of the user
(3) Photograph of a face of the user
(4) SNS (Social Networking Service) registration content of the user
(5) Product number of the product
Examples of the user preference information may include the followings.
(1) Preference of the user on content
(2) Preference of the user on image quality setting
Examples of the user operation information may include the followings.
(1) Kind of the content and application displayed on the screen in real time
(2) Display mode of the application
(3) Display mode of the content
(4) Reproduction state of the content
(5) History of image quality change by the user
(6) History of viewing time of the user Further, the system circuit 120 generates the specific information 130 that includes the display panel information Pd, the environment information Ed, etc. acquired from the panel drive circuit 112, and transmits the generated specific information 130 to the outside (the information processing unit 300) via the network communication circuit 120I. Here, it may be assumed that the user has operated the controller 100A to input the user information Ud as a remote control signal to the system circuit 120 (the processor 120A) via the controller receiving circuit 120J. In this case, the system circuit 120 generates the specific information 130 that also includes the user information Ud in addition to the display panel information Pd and the environment information Ed, and transmits the generated specific information 130 to the outside (the information processing unit 300) via the network communication circuit 120I. It is to be noted that, when the display panel information Pd, the environment information Ed, etc. are not transmitted from the panel drive circuit 112 upon operation of the controller 100A by the user, the system circuit 120 generates the specific information 130 that does not include the display panel information Pd and the environment information Ed but includes the user information Ud, and outputs the generated specific information 130 to the outside (the information processing unit 300) via the network communication circuit 120I.

[Content Storage Unit 400]

The content storage unit 400 stores content data Cd. The content data Cd may include, for example, the video content data Id, and the content attribute data Ad. The content attribute data Ad is information that has been originally attached to the video content data Id and is related to what is in the video content data Id, etc. It is to be noted that the content storage unit 400 may store, as the content data Cd, data not including the content attribute data Ad. The video content data Id may preferably have a format that is allowed to be subjected to an information process in the information processing unit 300. The video content data Id may preferably have, for example, a data format that is not encoded. For example, the content storage unit 400 may receive the content data Cd from the information processing unit 300. The content storage unit 400 reads the content data Cd in response to a request from the information processing unit 300, and transmits the read content data Cd to the information processing unit 300.

[Information Processing Unit 300]

The information processing unit 300 derives the parameter Pp, that determines image quality, from the specific information 130 received from the video display unit 100, and transmits, to the video display unit 100, the derived parameter Pp or related data related thereto. The specific information 130 includes at least the display panel information Pd out of the display panel information Pd, the environment information Ed, and the user information Ud. The parameter Pp includes at least the control value of the display panel 111, and may include values (for example, the image quality setting value) other than the control value of the display panel 111 in accordance with the information included in the specific information 130.

When deriving the parameter Pp, the information processing unit 300 analyses the display panel information Pd included in the specific information 130, and derives a setting range of image quality that is allowed to be exhibited by each display panel 111 and a control range of the display device. Also, when deriving the parameter Pp, the information processing unit 300 analyses the user information Ud, the environment information Ed, etc. included in the specific information 130, and derives a setting range of image quality preferable for each of users. Also, the information processing unit 300 analyses the content attribute data Ad included in the content data Cd, and derives a setting range of image quality preferable for the respective contents. The information processing unit 300 utilizes at least the display panel information Pd out of the display panel information Pd, the user information Ud, the environment information Ed, and the content attribute data Ad to derive a preferable setting range of image quality and a preferable control range of the display device, thereby deriving the parameter Pp.

When the video content data Id has a format that is allowed to be subjected to an information process in the information processing unit 300, the information processing unit 300 may generate the processed content data Id' by processing the video content data Id with the use of the parameter Pp derived from the specific information 130. Further, when the content attribute data Ad has been originally attached to the video content data Id, the information processing unit 300 may generate the processed content data Id' by processing the video content data Id with the use of the parameter Pp derived from the specific information 130, and the content attribute data Ad. When the information processing unit 300 has generated the processed content data Id', the information processing unit 300 transmits the processed content data Id' to the video display unit 100.

Even when the video content data Id has a format that is allowed to be subjected to an information process in the information processing unit 300, the information processing unit 300 may not process the video content data Id with the use of the parameter Pp derived from the specific information 130. In this case, the information processing unit 300 may set the parameter Pp as the metadata Md related to the video content data Id. In this case, the metadata Md is the parameter Pp. Further, when the content attribute data Ad has been originally attached to the video content data Id, the information processing unit 300 may set the parameter Pp and the content attribute data Ad as the metadata Md. In this case, the metadata Md is the parameter Pp and the content attribute data Ad. When the information processing unit 300 has generated the metadata Md, the information processing unit 300 transmits, to the video display unit 100, the video content data Id together with the metadata Md.

When the video content data Id does not have a format that is allowed to be subjected to an information process in the information processing unit 300, the information processing unit 300 does not process the video content data Id with the use of the parameter Pp derived from the specific information 130. In this case, the information processing unit 300 may set the parameter Pp as the metadata Md related to the video content data Id. In this case, the metadata Md is the parameter Pp. Further, when the content attribute data Ad has been originally attached to the video content data Id, the information processing unit 300 may set the parameter Pp and the content attribute data Ad as the metadata Md. In this case, the metadata Md is the parameter Pp and the content attribute data Ad. When the information processing unit 300 has generated the metadata Md, the information processing unit 300 transmits, to the video display unit 100, the video content data Id together with the metadata Md.

When the user has not selected the content data Cd upon reception of the specific information 130 by the video display unit 100, the information processing unit 300 transmits, to the video display unit 100, only the parameter Pp derived from the specific information 130. When the user has selected the content data Cd upon reception of the specific information 130 by the video display unit 100, the information processing unit 300 transmits, to the video display unit 100, the video content data Id, etc. together with the parameter Pp as described above. The information processing unit 300 determines whether or not the user has selected the content data Cd based on the user information Ud included in the specific information 130.

The information processing unit 300 may include, for example, an arithmetic section 310, a receiving section 320, and a transmitting section 330. The receiving section 320 receives the specific information 130 from the video display unit 100 that includes the display panel 111. Also, the receiving section 320 reads the content data Cd from the content storage unit 400. Further, the receiving section 320 reads, from the data storage unit 500, the parameter Pp, the metadata Md including the parameter Pp, or the specific information 130.

The arithmetic section 310 derives, from the specific information 130 received in the receiving section 320, the parameter Pp that determines image quality or the related data related thereto. The arithmetic section 310 may cause the data storage unit 500 to temporarily store the specific information 130 received in the receiving section 320, and may cause the receiving section 320 to read the stored specific information 130 from the data storage unit 500 later. When the receiving section 320 receives the specific information 130, the arithmetic section 310 performs the above-described various processes to generate the metadata Md, the processed content data Id', etc. The arithmetic section 310 may cause the data storage unit 500 to temporarily store the parameter Pp, the metadata Md, etc. and may cause the receiving section 320 to read the stored parameter Pp, the metadata Md, etc. from the data storage unit 500 later.

The transmitting section 330 transmits, to the distribution server 600, the video content data Id, the processed content data Id', the parameter Pp, the metadata Md, etc. It is to be noted that, when the parameter Pp or the metadata Md is the only data to be transmitted, the transmitting section 330 transmits the parameter Pp or the metadata Md to the distribution server 600.

[Data Storage Unit 500]

The data storage unit 500 stores the parameter Pp that determines image quality, and the metadata Md that includes the parameter Pp. The data storage unit 500 may store not only the parameter Pp and the metadata Md but also the specific information 130. The data storage unit 500 stores the parameter Pp, the metadata Md, or the specific information 130 in response to a request from the information processing unit 300. The data storage unit 500 reads the parameter Pp, the metadata Md that includes the parameter Pp, or the specific information 130 and transmits the read parameter Pp, metadata Md, or specific information 130 to the information processing unit 300 in response to a request from the information processing unit 300.

[Distribution Server 600]

In response to an instruction from the information processing unit 300, the distribution server 600 distributes the processed content data Id' to the video display unit 100, or distributes, to the information processing unit 300, the video content data Id together with the metadata Md. The distribution server 600 may distribute the processed content data Id', the video content data Id, etc., for example, by streaming or by downloading.

[Video Display Method]

Figure 5:
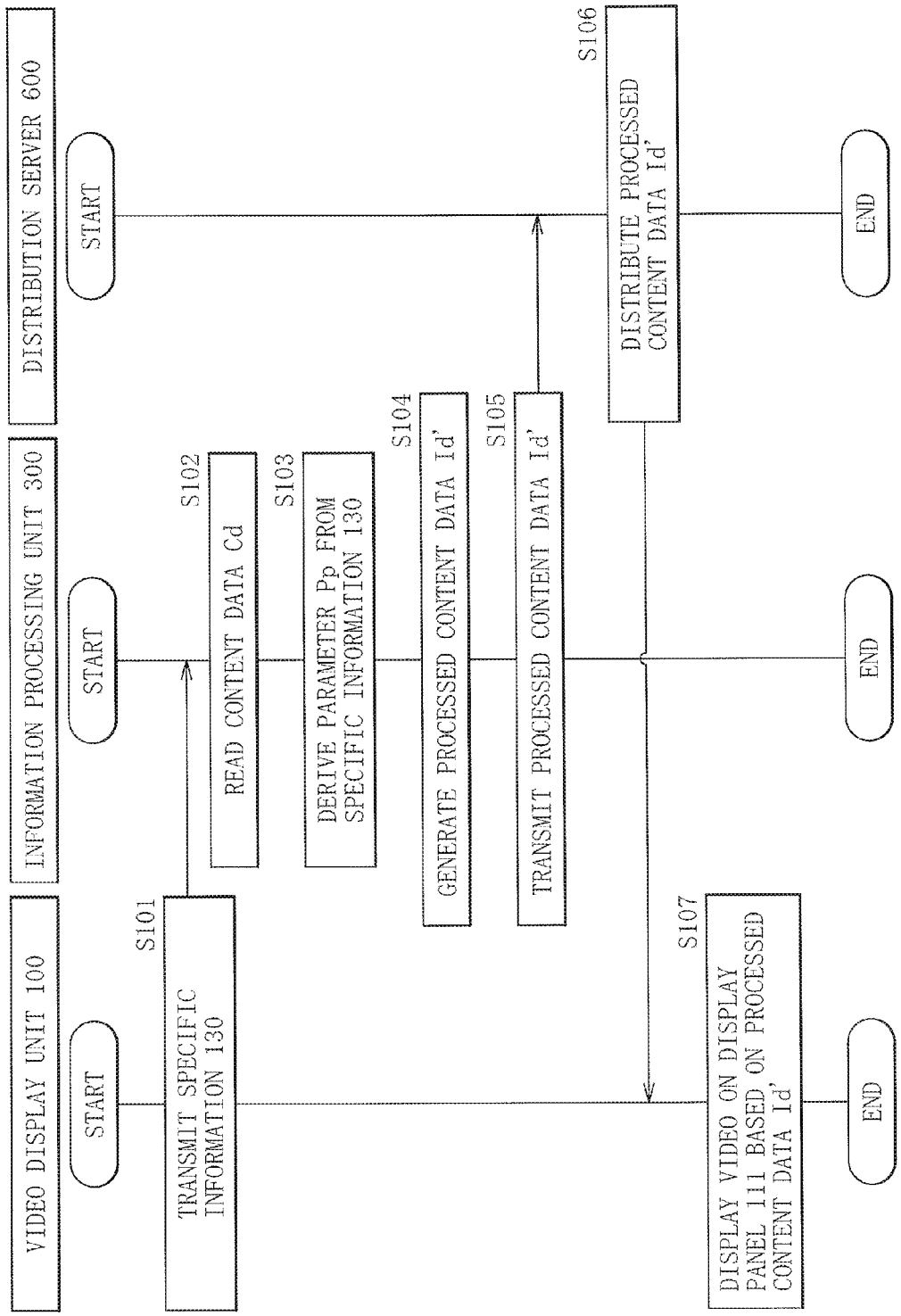
FIG. 5 is a diagram illustrating an example of a procedure of an operation in the video display system illustrated in FIG. 1.
Figure 6:
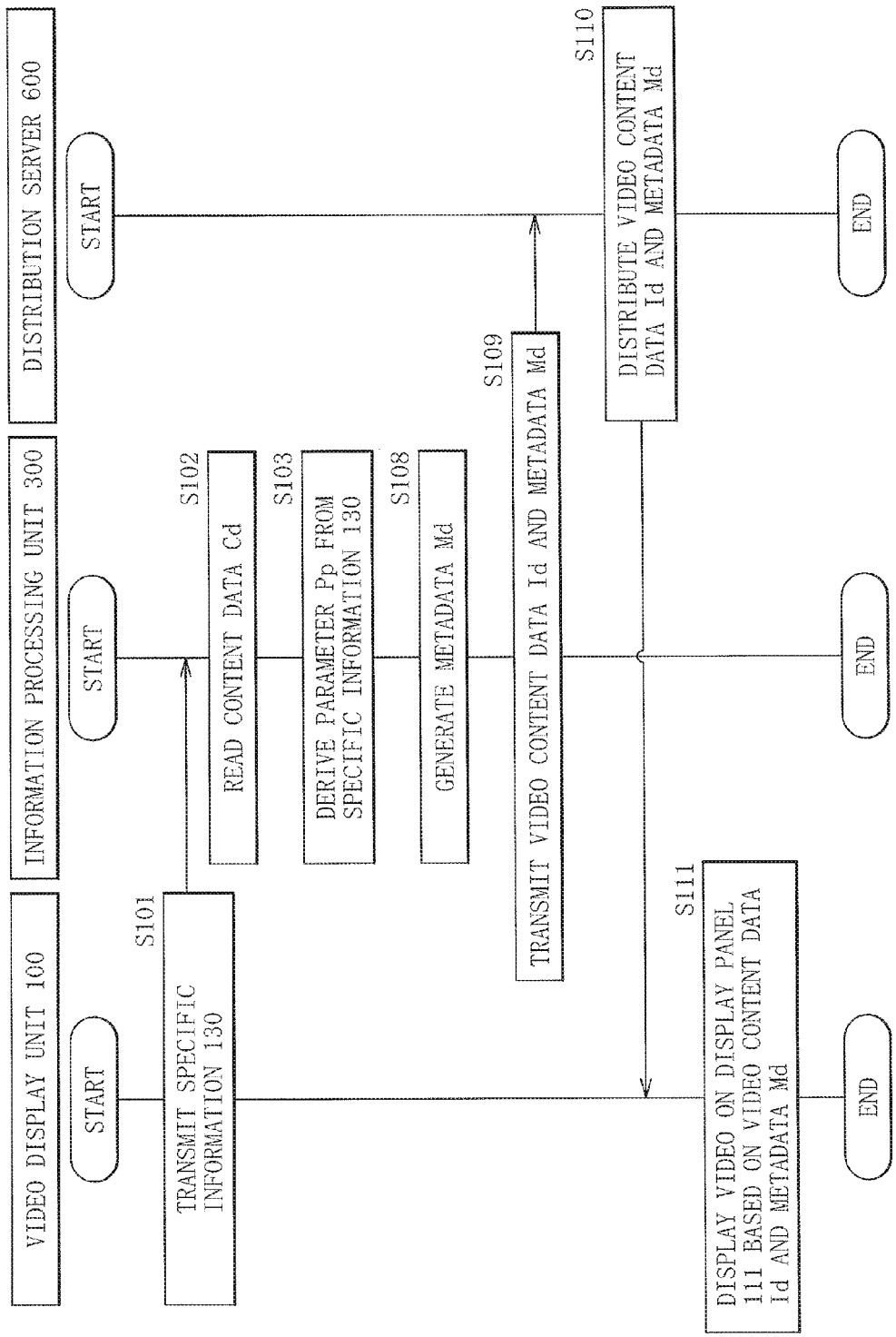
FIG. 6 is a diagram illustrating another example of the procedure of the operation in the video display system illustrated in FIG. 1.

Next, description is provided of a method of displaying a video on the display panel 111 in the video display system 1. FIGS. 5 and 6 each illustrate an example of a procedure of an operation in the video display system 1. First, the video display unit 100 generates the specific information 130, and transmits the generated specific information 130 to the information processing unit 300 (step S101, FIGS. 5 and 6). Examples of a timing to generate the specific information 130 may include (1) when there is a request from the information processing unit 300, (2) when the user turns on a power source of the video display unit 100, (3) when the user selects the content data Cd, and (4) when a predetermined timing has come in the video display unit 100.

Next, the information processing unit 300 reads the content data Cd from the content storage unit 400 (step S102, FIGS. 5 and 6). Subsequently, the information processing unit 300 derives the parameter Pp that determines image quality from the specific information 130 received from the video display unit 100 (step S103, FIGS. 5 and 6). Upon reception of the specific information 130 from the video display unit 100, when the specific information 130 does not include information related to the content data Cd that the user selects, the information processing unit 300 transmits the parameter Pp to the video display unit 100. At this time, the video display unit 100 utilizes the parameter Pp to adjust image quality. A video having adjusted image quality is therefore displayed on the display panel 111 also in this case. Upon reception of the specific information 130 from the video display unit 100, when the specific information 130 includes the information related to the content Cd that the user selects, the information processing unit 300 continues to perform a succeeding operation.

Next, the information processing unit 300 performs the above-described processes depending on the format of the video content data Id included in the content data Cd, presence or absence of the content attribute data Ad, etc., and thereby generates transmission data such as the processed content data Id' or the metadata Md. When the information processing unit 300 has generated the processed content data Id' (step S104, FIG. 5), the information processing unit 300 encodes the processed content data Id', and transmits the encoded data to the distribution server 600 (step S105, FIG. 5). Next, the distribution server 600 distributes, to the video display unit 100, the processed content data Id' received from the information processing unit 300 (step S106, FIG. 5). Lastly, the video display unit 100 displays a video on the display panel 111 based on the processed content data Id' received from the distribution server 600 (step S107, FIG. 5). A video having adjusted image quality is thus displayed on the display panel 111.

On the other hand, when the information processing unit 300 has generated the metadata Md (step S108, FIG. 6), the information processing unit 300 transmits the video content data Id and the metadata Md to the distribution server 600 (step S109, FIG. 6). Here, the video content data Id may be encoded as necessary.

Next, the distribution server 600 distributes, to the video display unit 100, the video content data Id and the metadata Md received from the information processing unit 300 (step S110, FIG. 6). Lastly, the video display unit 100 displays a video on the display panel 111 based on the video content data Id while controlling the display panel 111 based on the metadata Md received from the distribution server 600 (step S111, FIG. 6). A video having adjusted image quality is thus displayed on the display panel 111.

[Effects]

Next, effects of the video display system 1 of the present embodiment are described. In the present embodiment, the parameter Pp that determines image quality or the related data related thereto is derived, in the information processing unit 300, from the specific information 130 received from the video display unit 100. The derived parameter Pp or the related data related thereto is transmitted from the information processing unit 300 to the video display unit 100. The related data may be specifically the processed content data Id', or a set of the video content data Id and the metadata Md. It is thus possible to cause the external unit (the information processing unit 300, the content storage unit 400, the data storage unit 500, and the distribution server 600) to perform the information process, which puts a load thereon, necessary for achieving a video having appropriate image quality. As a result, it is possible to achieve the video having the appropriate image quality while suppressing increase in manufacturing cost of the video display unit 100.

2. Modification of First Embodiment

Figure 7:
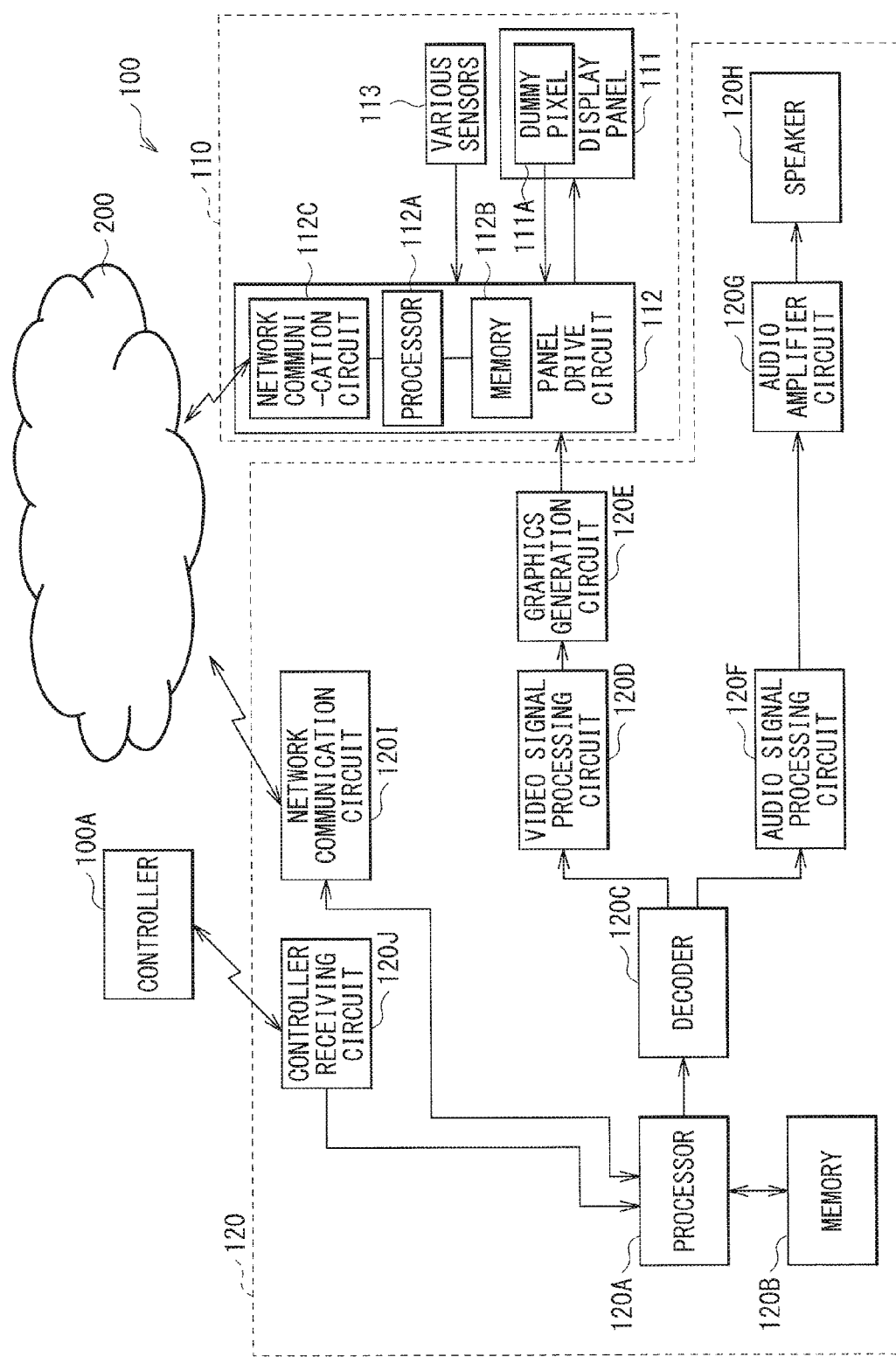
FIG. 7 is a diagram illustrating a modification of the video display unit illustrated in FIG. 2.
Figure 8:
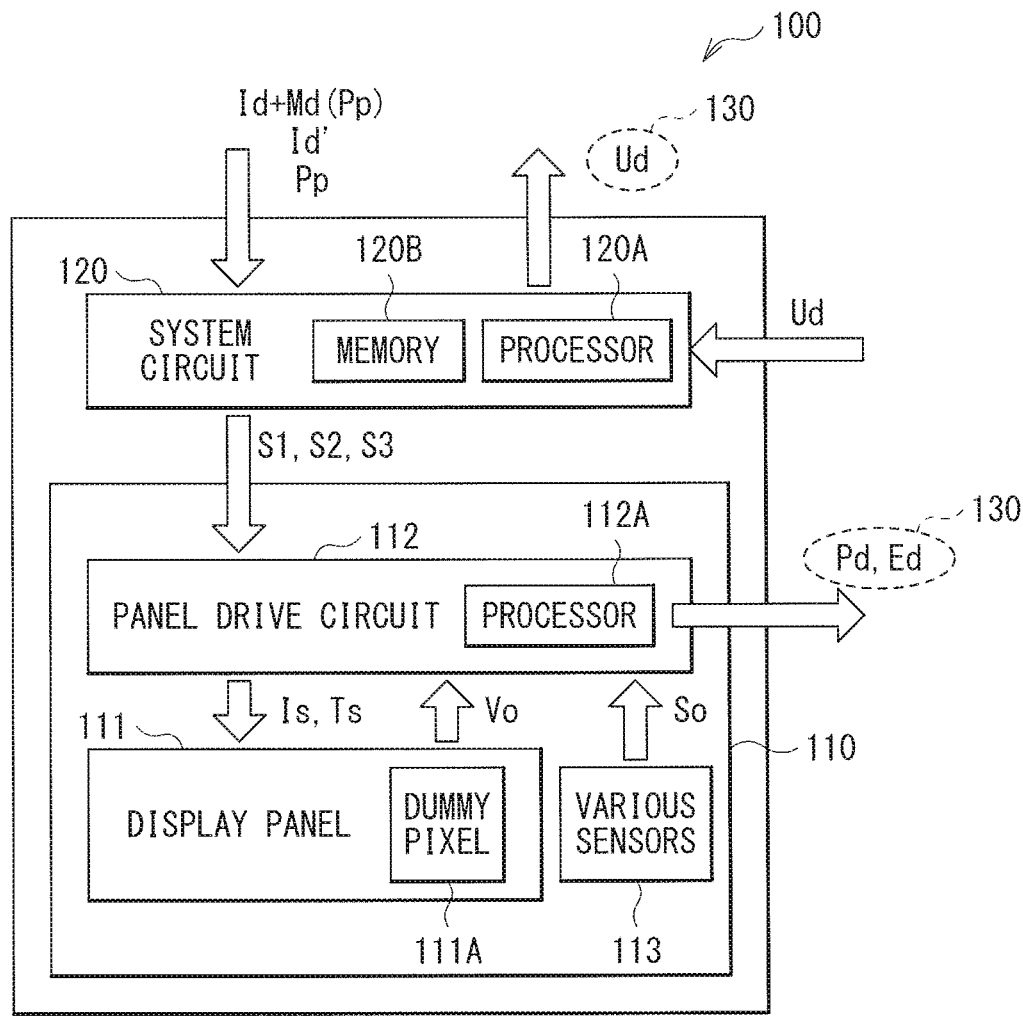
FIG. 8 is a diagram illustrating a modification of a flow of data in the video display unit illustrated in FIG. 7.
Figure 9:
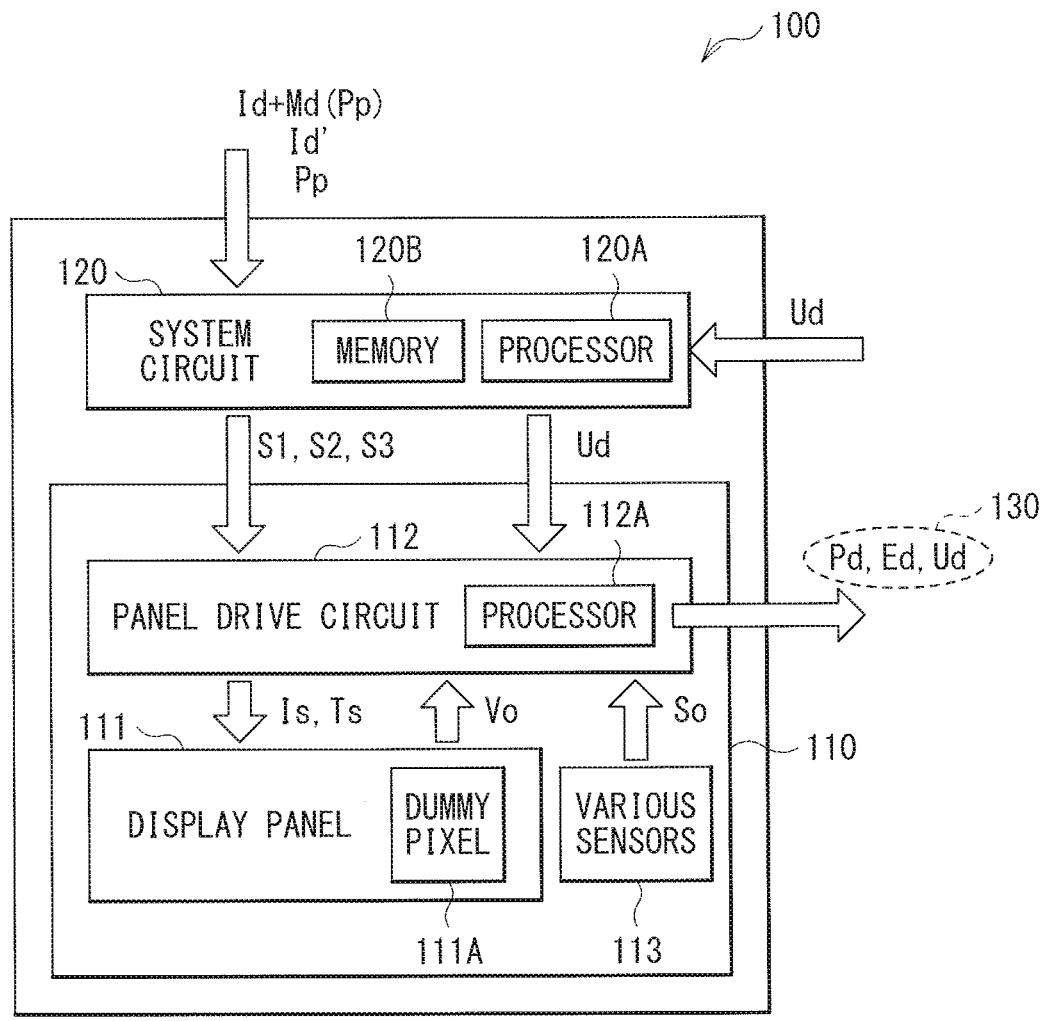
FIG. 9 is a diagram illustrating another modification of the flow of the data in the video display unit illustrated in FIG. 7.

FIG. 7 illustrates a modification of the video display unit 100. FIGS. 8 and 9 each illustrate a modification of a flow of data in the video display unit 100 according to the present modification. In the above-described first embodiment, communication with the information processing unit 300, etc. on the network 200 is achieved by the network communication circuit 120I provided in the system circuit 120. The communication with the information processing unit 300, etc. on the network 200 may be achieved, for example, by a network communication circuit 112C newly provided in the panel drive circuit 112 as illustrated in FIG. 7. In other words, in the present modification, the panel drive circuit 112 includes the network communication circuit 112C that is communicatable with the information processing unit 300, etc. on the network 200.

In the present modification, the panel drive circuit 112 may include, for example, the network communication circuit 112C and a memory 112B in addition to the processor 112A. The memory 112B may store, for example, the display panel information Pd, the environment information Ed, etc. In the present modification, the panel drive circuit 112 communicates with the information processing unit 300, etc. on the network 200 without the system circuit 120 in between to transmit the display panel information Pd, the environment information Ed, etc. to the information processing unit 300. At this time, as illustrated in FIG. 8, the system circuit 120 may transmit the user information Ud to the information processing unit 300 as in the above-described first embodiment. Further, as illustrated in FIG. 9, the panel drive circuit 112 may also transmit the user information Ud to the information processing unit 300 without the system circuit 120 in between.

In the present modification, in the information processing unit 300, the parameter Pp that determines image quality or the related data related thereto is derived from the specific information 130 received from the video display unit 100, as in the above-described first embodiment. Further, the derived parameter Pp or the related data related thereto is transmitted from the information processing unit 300 to the video display unit 100. It is thus possible to cause the external unit (the information processing unit 300, the content storage unit 400, the data storage unit 500, and the distribution server 600) to perform the information process, which puts a load thereon, necessary for achieving a video having appropriate image quality. As a result, it is possible to achieve the video having the appropriate image quality while suppressing increase in manufacturing cost of the video display unit 100.

3. Second Embodiment

Configuration

Figure 10:
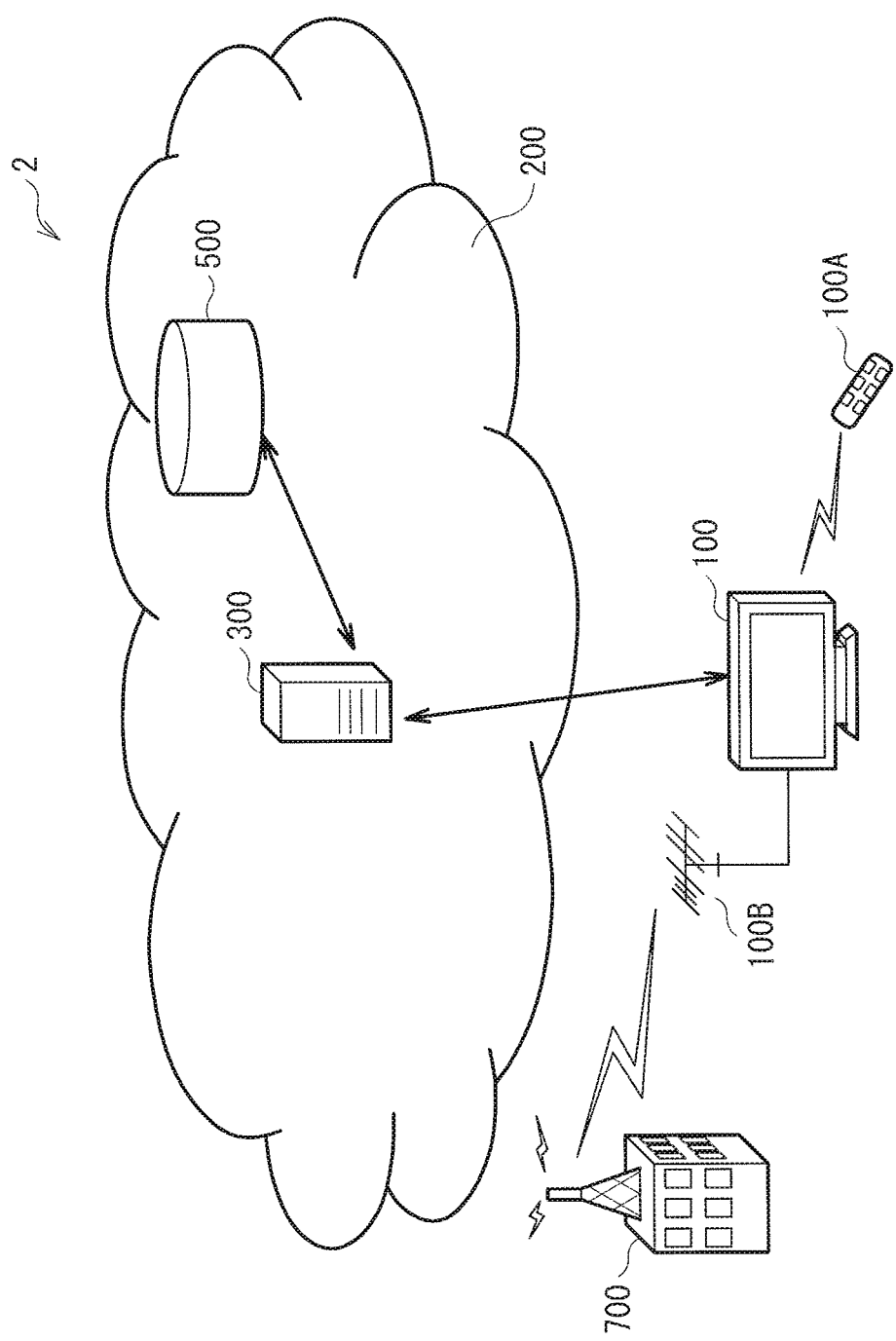
FIG. 10 is a diagram illustrating an example of a schematic configuration of a video display system according to a second embodiment of the present technology.

FIG. 10 illustrates an example of a schematic configuration of a video display system 2 according to a second embodiment of the present technology. The video display system 2 is configured so that the video display unit 100 acquires content from a broadcast station 700. The video display system 2 may include, for example, the video display unit 100, the information processing unit 300, the data storage unit 500, and the broadcast station 700. The video display unit 100 includes an antenna 100B that receives a television broadcast signal from the broadcast station 700. The television broadcast signal may include, for example, the video content data Id, and the content attribute data Ad.

Figure 11:
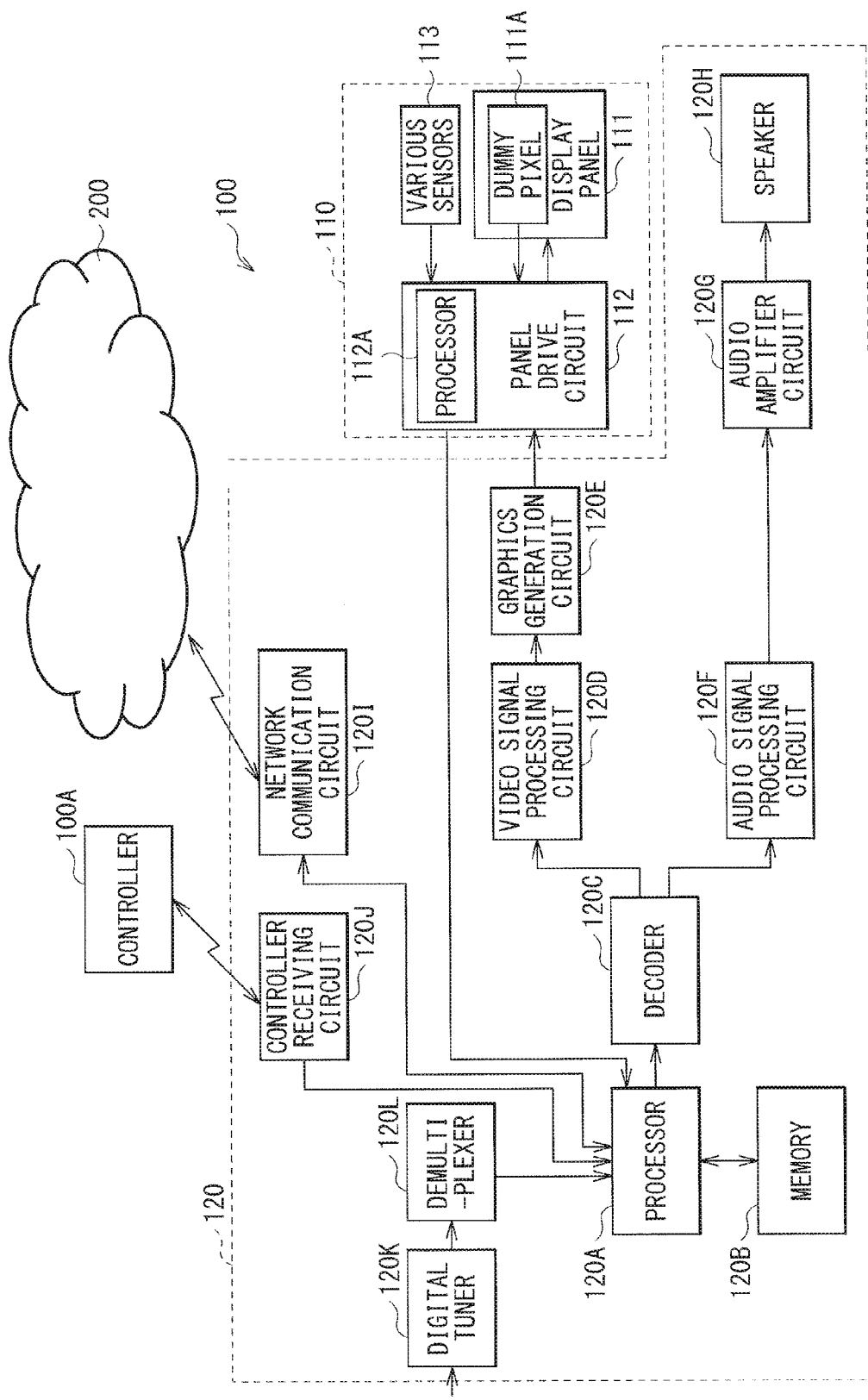
FIG. 11 is a diagram illustrating an example of an inner configuration of the video display unit illustrated in FIG. 10.
Figure 12:
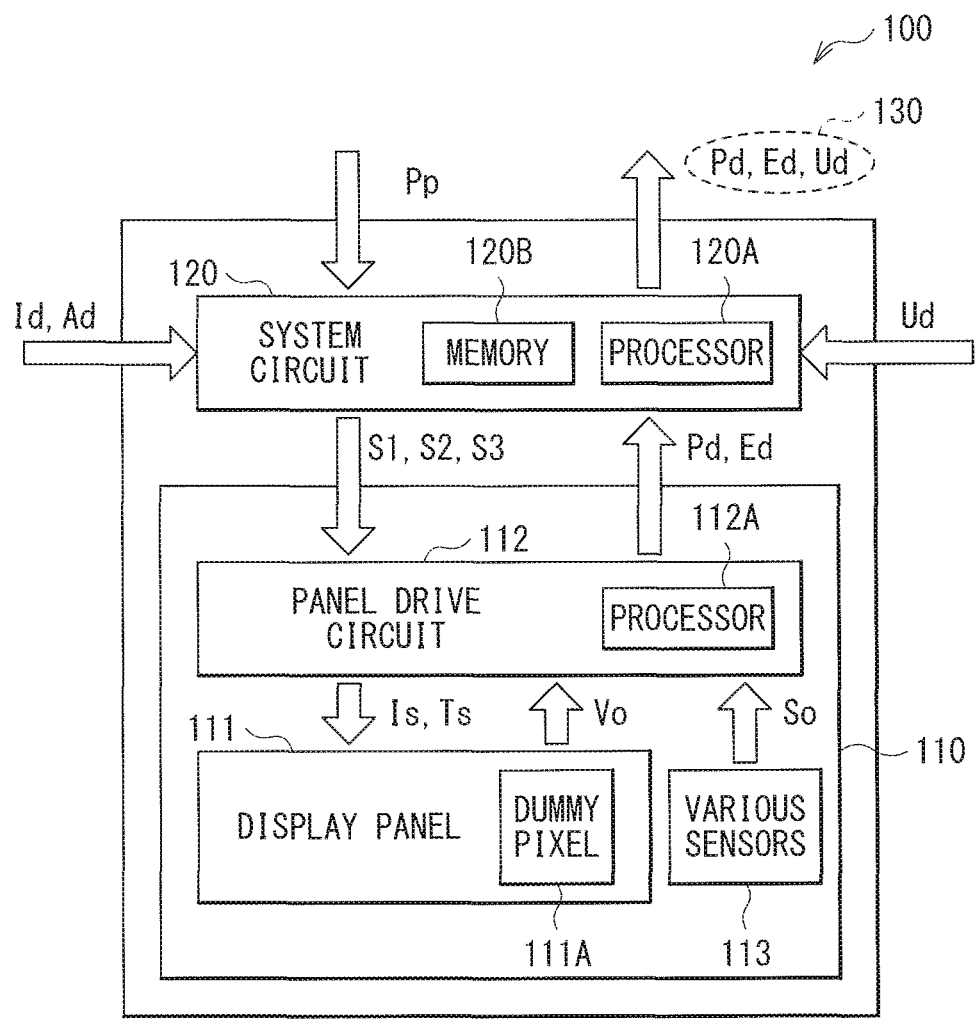
FIG. 12 is a diagram illustrating an example of a flow of data in the video display unit illustrated in FIG. 11.

FIG. 11 illustrates an example of an inner configuration of the video display unit 100 of the present embodiment. FIG. 12 illustrates an example of a flow of data in the video display unit 100 illustrated in FIG. 11. The video display unit 100 of the present embodiment corresponds to a video display unit in which a digital tuner 120K and a demultiplexer 120L are further provided in the video display unit 100 in the first embodiment. The digital tuner 120K processes the television broadcast signal inputted thereto via the antenna 100B, and outputs a predetermined transport stream corresponding to a channel selected by the user. The demultiplexer 120L may extract, for example, a partial TS (Transport Stream) corresponding to the channel selected by the user from the transport stream obtained by the digital tuner 120K. The processor 120A may store the partial TS obtained by the demultiplexer 120L in the memory 120B, or may transmit the partial TS read from the memory 120B to the decoder 120C, for example. The decoder 120C may perform a decoding process on a video PES packet included in the partial TS obtained by the demultiplexer 120L and may thereby obtain video data, for example.

[Method of Displaying Video]

Figure 13:
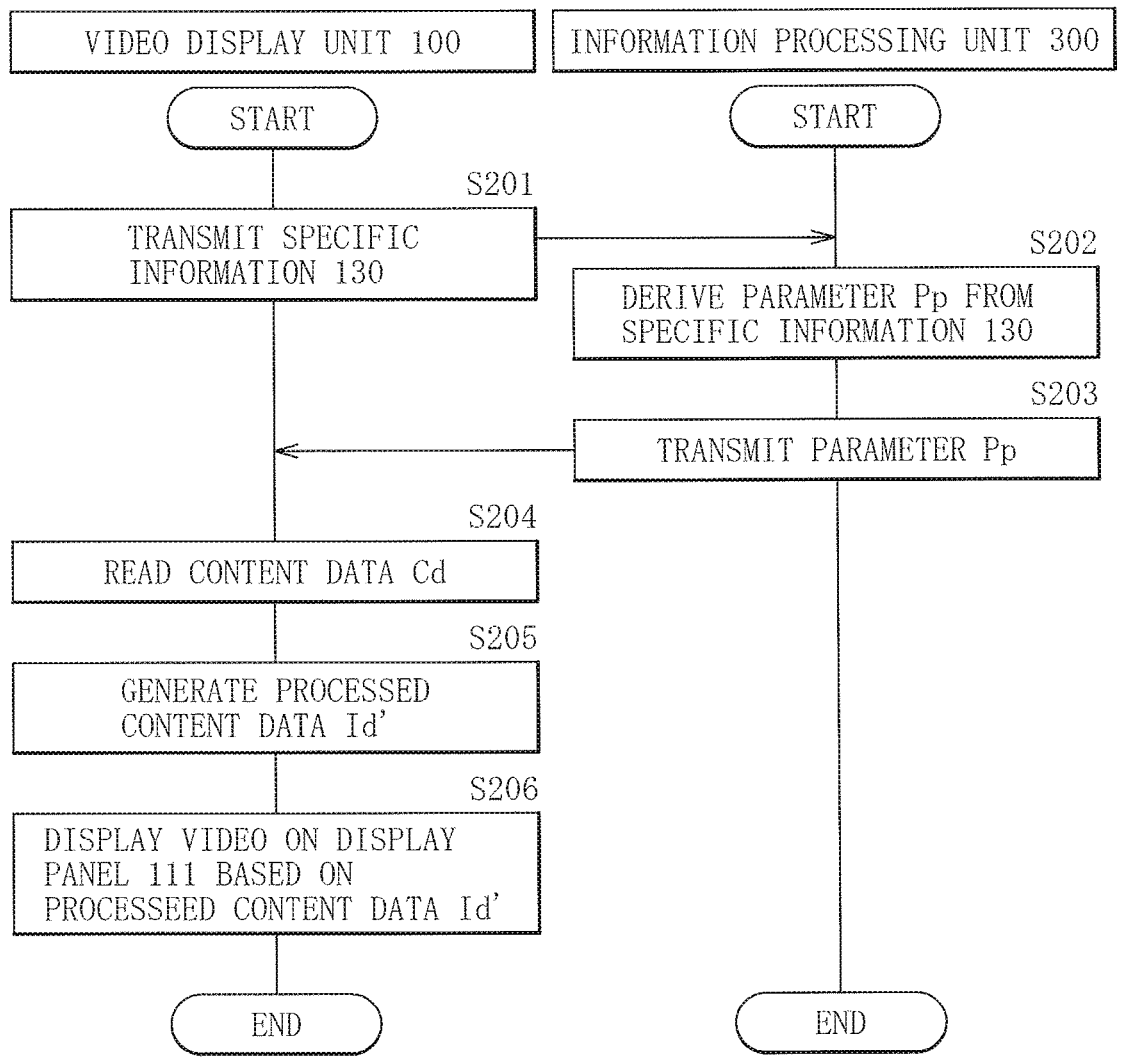
FIG. 13 is a diagram illustrating an example of a procedure of an operation in the video display system illustrated in FIG. 10.
Figure 14:
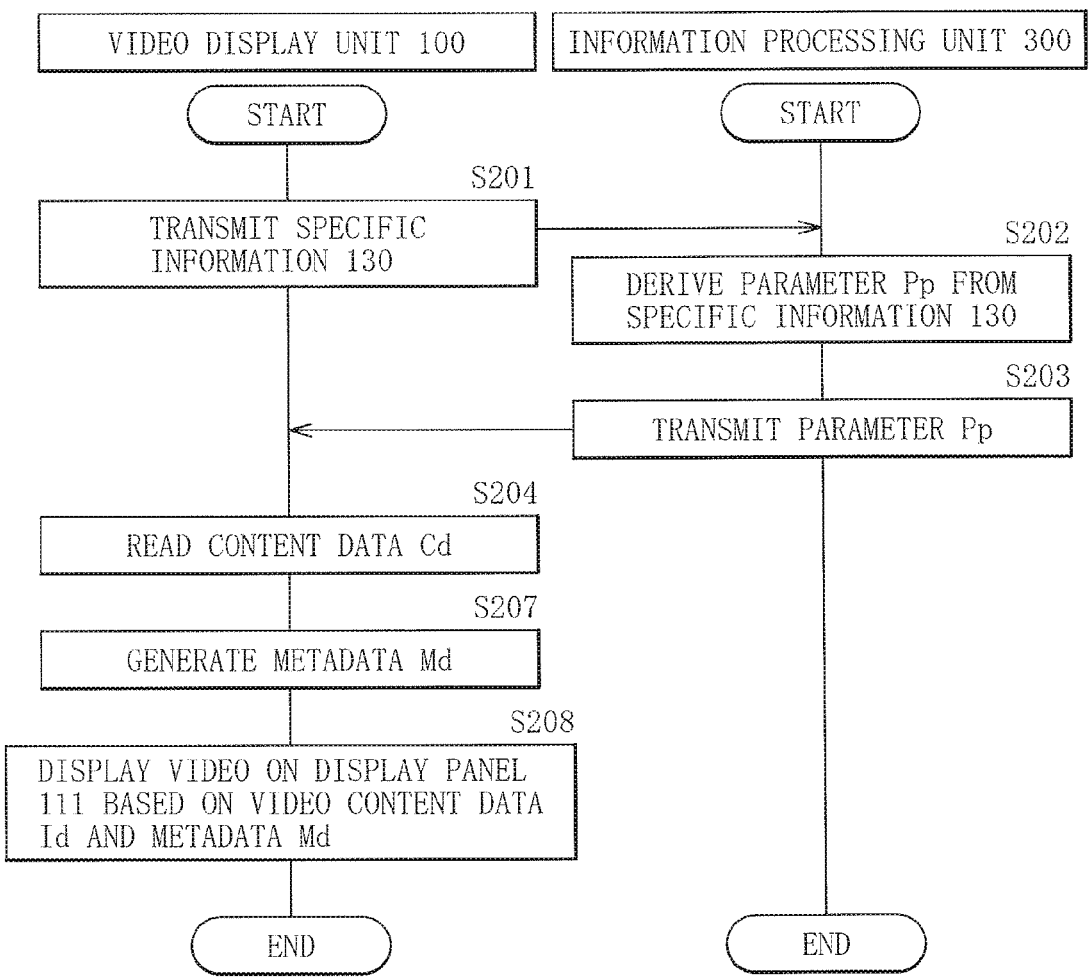
FIG. 14 is a diagram illustrating another example of the procedure of the operation in the video display system illustrated in FIG. 10.

Next, description is provided of a method of displaying a video on the display panel 111 in the video display system 2. FIGS. 13 and 14 each illustrate an example of a procedure of an operation in the video display system 2. First, the video display unit 100 generates the specific information 130, and transmits the generated specific information 130 to the information processing unit 300 (step S201, FIGS. 13 and 14). The timing to generate the specific information 130 is similar to that in the above-described first embodiment.

Next, the information processing unit 300 derives the parameter Pp that determines image quality from the specific information 130 received from the video display unit 100 (step S202, FIGS. 13 and 14), and transmits the derived parameter Pp to the video display unit 100 (step S203, FIGS. 13 and 14).

Next, the video display unit 100 performs a process similar to that in the above-described first embodiment depending on the format of the video content data Id included in the content data Cd extracted from the television broadcast signal, presence or absence of the content attribute data Ad, etc., and thereby generates transmission data such as the processed content data Id' or the metadata Md.

Specifically, when the video content data Id has a format that is allowed to be subjected to an information process in the video display unit 100, the video display unit 100 may generate the processed content data Id' by processing the video content data Id with the use of the parameter Pp. Further, when the content attribute data Ad has been originally attached to the video content data Id, the video display unit 100 may generate the processed content data Id' by processing the video content data Id with the use of the parameter Pp and the content attribute data Ad.

Even when the video content data Id has the format that is allowed to be subjected to an information process in the video display unit 100, the video display unit 100 may not process the video content data Id with the use of the parameter Pp. In this case, the video display unit 100 may set the parameter Pp as the metadata Md related to the video content data Id. In this case, the metadata Md is the parameter Pp. Further, when the content attribute data Ad has been originally attached to the video content data Id, the video display unit 100 may set the parameter Pp and the content attribute data Ad as the metadata Md. In this case, the metadata Md is the parameter Pp and the content attribute data Ad.

When the video content data Id does not have the format that is allowed to be subjected to an information process in the video display unit 100, the video display unit 100 does not process the video content data Id with the use of the parameter Pp. In this case, the video display unit 100 may set the parameter Pp as the metadata Md related to the video content data Id. In this case, the metadata Md is the parameter Pp. Further, when the content attribute data Ad has been originally attached to the video content data Id, the video display unit 100 may set the parameter Pp and the content attribute data Ad as the metadata Md. In this case, the metadata Md is the parameter Pp and the content attribute data Ad.

Next, when the video display unit 100 has generated the processed content data Id' (step S205, FIG. 13), the video display unit 100 encodes the processed content data Id', and transmits the encoded data to the processor 120A. Lastly, the video display unit 100 displays a video on the display panel 111 based on the processed content data Id' (step S206, FIG. 13). A video having adjusted image quality is thus displayed on the display panel 111.

On the other hand, when the video display unit 100 has generated the metadata Md (step S207, FIG. 14), the video display unit 100 transmits the video content data Id and the metadata Md to the processor 120A. Here, the video content data Id may be encoded as necessary.

Next, the video display unit 100 displays a video on the display panel 111 based on the video content data Id and the metadata Md (step S208, FIG. 14). A video having adjusted image quality is thus displayed on the display panel 111.

[Effects]

Next, effects of the video display system 2 of the present embodiment are described. In the present embodiment, the parameter Pp that determines image quality is derived, in the information processing unit 300, from the specific information 130 received from the video display unit 100. The derived parameter Pp is transmitted from the information processing unit 300 to the video display unit 100. It is thus possible to cause the external unit (the information processing unit 300 and the data storage unit 500) to perform the information process, which puts a load thereon, necessary for achieving a video having appropriate image quality. As a result, it is possible to achieve the video having the appropriate image quality while suppressing increase in manufacturing cost of the video display unit 100.

4. Modification of Second Embodiment

Figure 15:
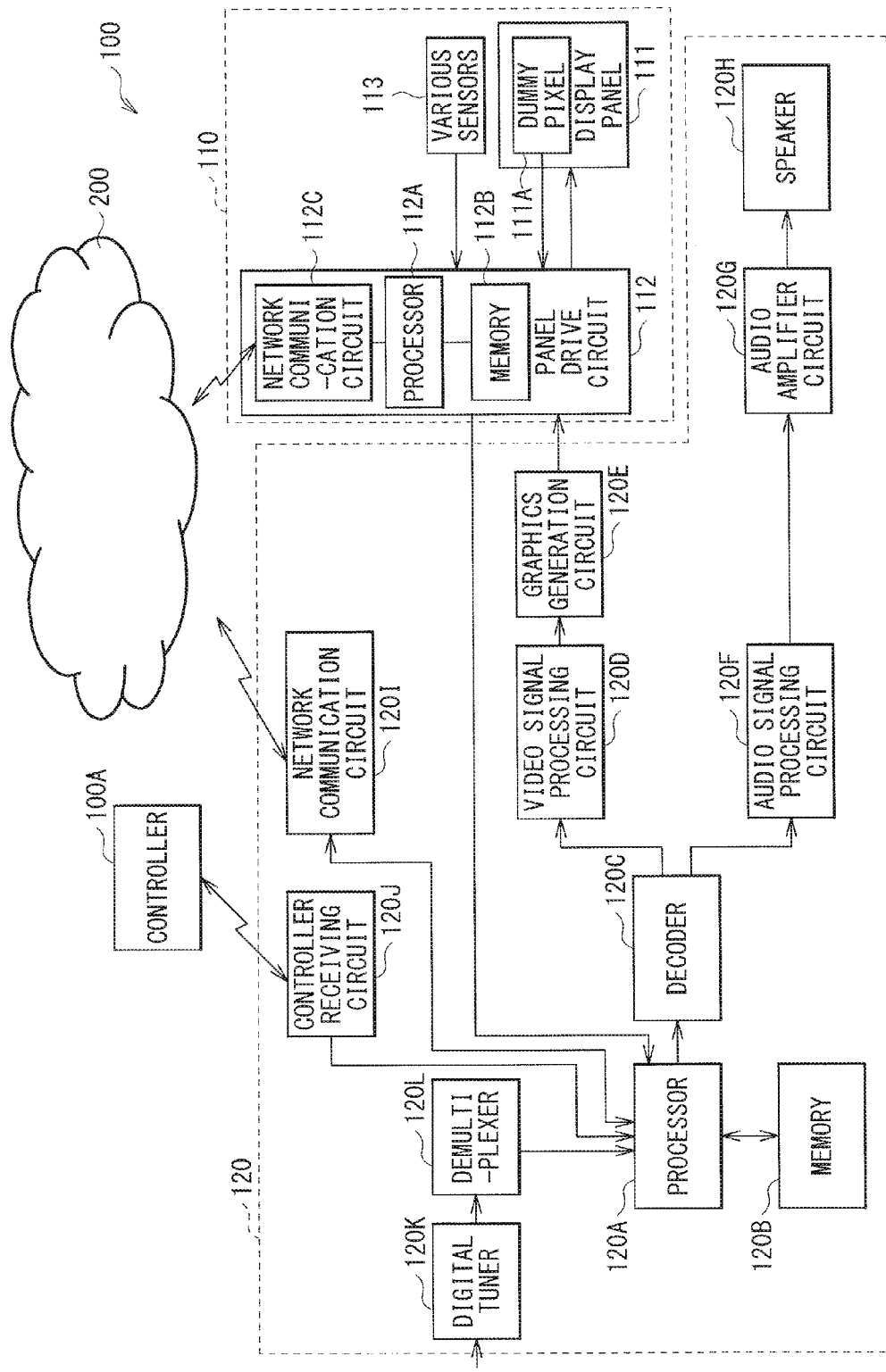
FIG. 15 is a diagram illustrating a modification of the video display unit illustrated in FIG. 10.
Figure 16:
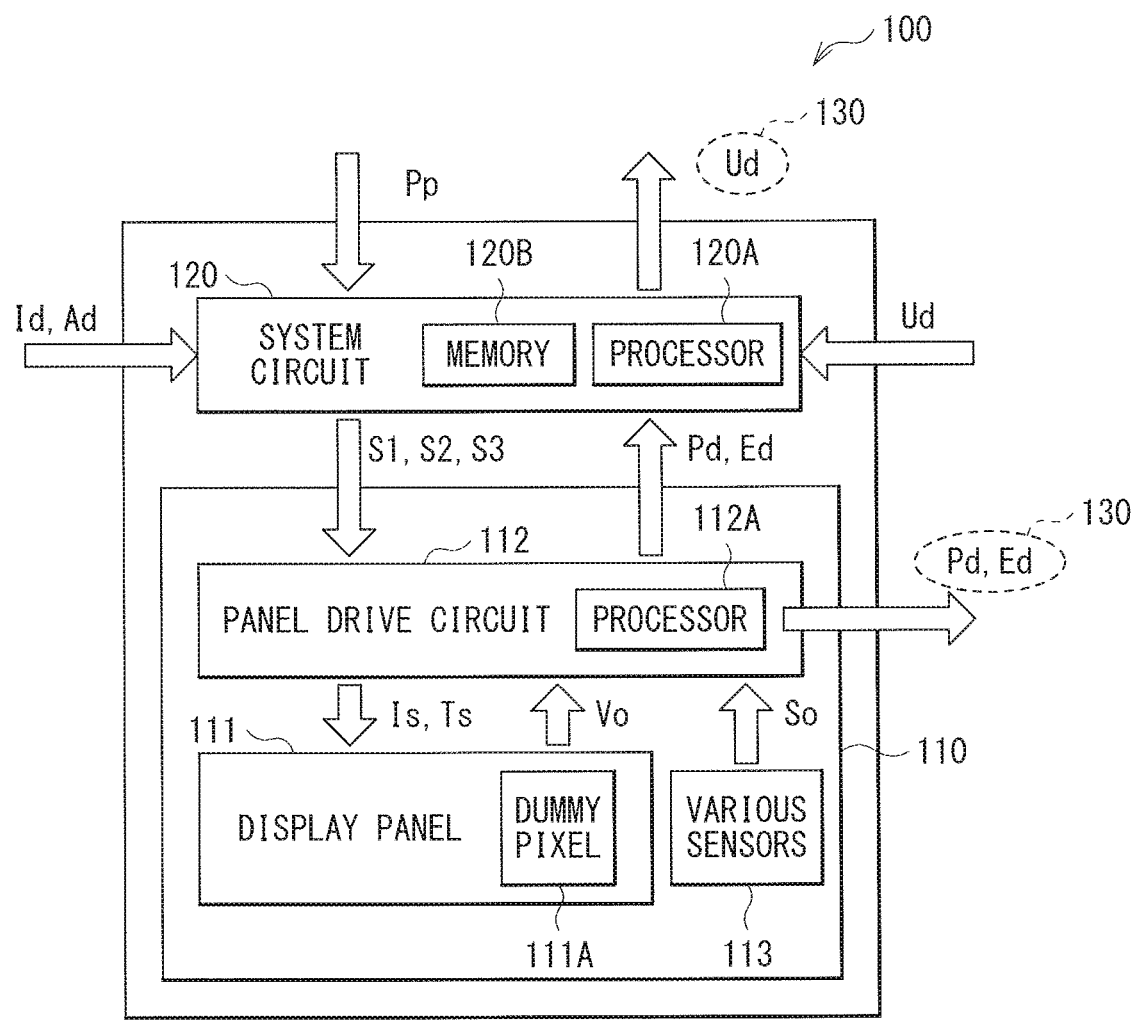
FIG. 16 is a diagram illustrating a modification of a flow of data in the video display unit illustrated in FIG. 15.
Figure 17:
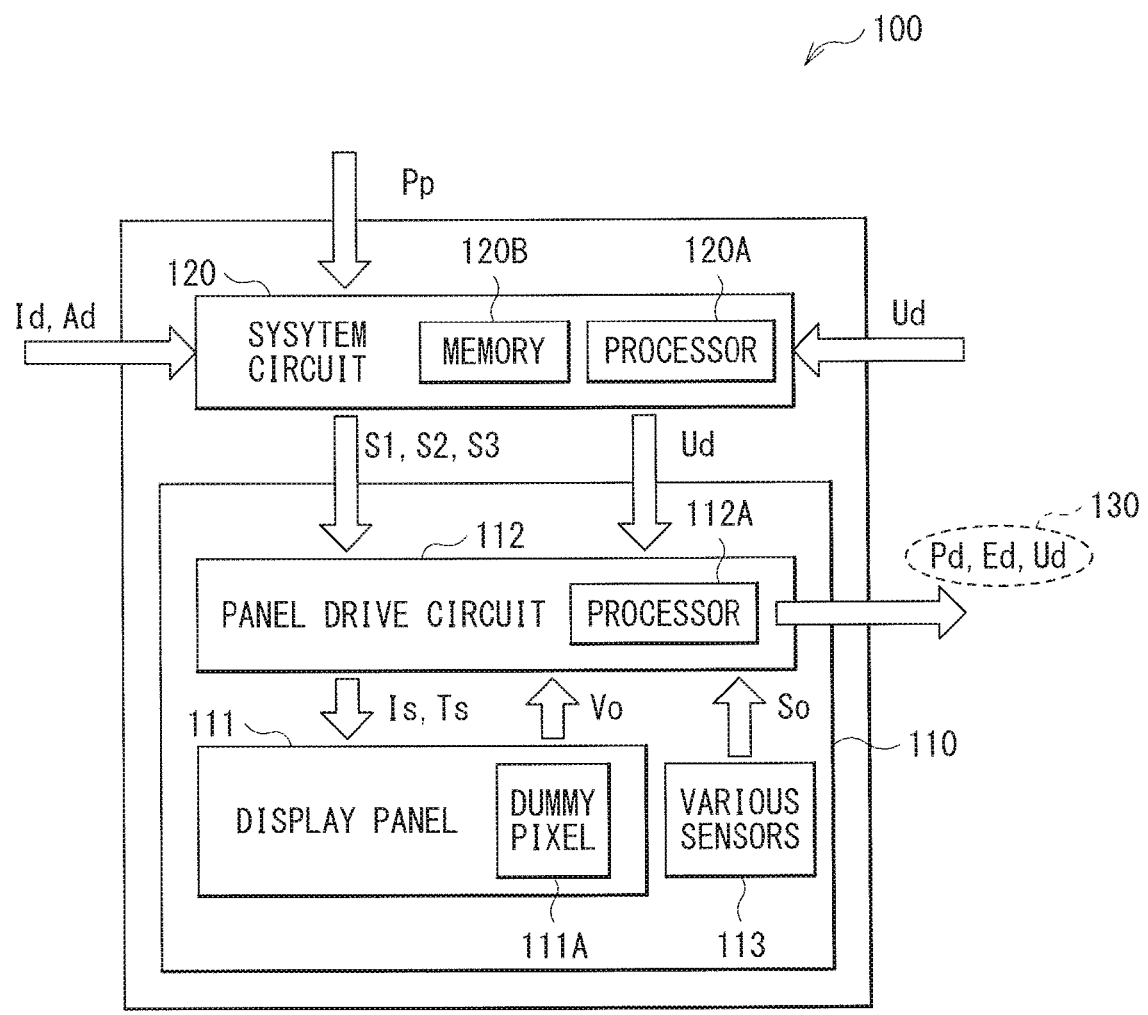
FIG. 17 is a diagram illustrating another modification of the flow of the data in the video display unit illustrated in FIG. 15.

FIG. 15 illustrates a modification of the video display unit 100. FIGS. 16 and 17 each illustrate a modification of a flow of data in the video display unit 100 according to the present modification. In the above-described second embodiment, communication with the information processing unit 300, etc. on the network 200 is achieved by the network communication circuit 120I provided in the system circuit 120. The communication with the information processing unit 300, etc. on the network 200 may be achieved, for example, by the network communication circuit 112C newly provided in the panel drive circuit 112 as illustrated in FIG. 15. In other words, in the present modification, the panel drive circuit 112 includes the network communication circuit 112C that is communicatable with the information processing unit 300, etc. on the network 200.

In the present modification, the panel drive circuit 112 may include, for example, the network communication circuit 112C and the memory 112B in addition to the processor 112A. The memory 112B may be, for example, for storing the display panel information Pd, the environment information Ed, etc. In the present modification, the panel drive circuit 112 communicates with the information processing unit 300, etc. on the network 200 without the system circuit 120 in between to transmit the display panel information Pd, the environment information Ed, etc. to the information processing unit 300. At this time, as illustrated in FIG. 16, the system circuit 120 may transmit the user information Ud to the information processing unit 300 as in the above-described second embodiment. Further, as illustrated in FIG. 17, the panel drive circuit 112 may also transmit the user information Ud to the information processing unit 300 without the system circuit 120 in between.

In the present modification, in the information processing unit 300, the parameter Pp that determines image quality is derived from the specific information 130 received from the video display unit 100. Further, the derived parameter Pp is transmitted from the information processing unit 300 to the video display unit 100. It is thus possible to cause the external unit (the information processing unit 300 and the data storage unit 500) to perform the information process, which puts a load thereon, necessary for achieving a video having appropriate image quality. As a result, it is possible to achieve the video having the appropriate image quality while suppressing increase in manufacturing cost of the video display unit 100.

5. Third Embodiment

Figure 18:
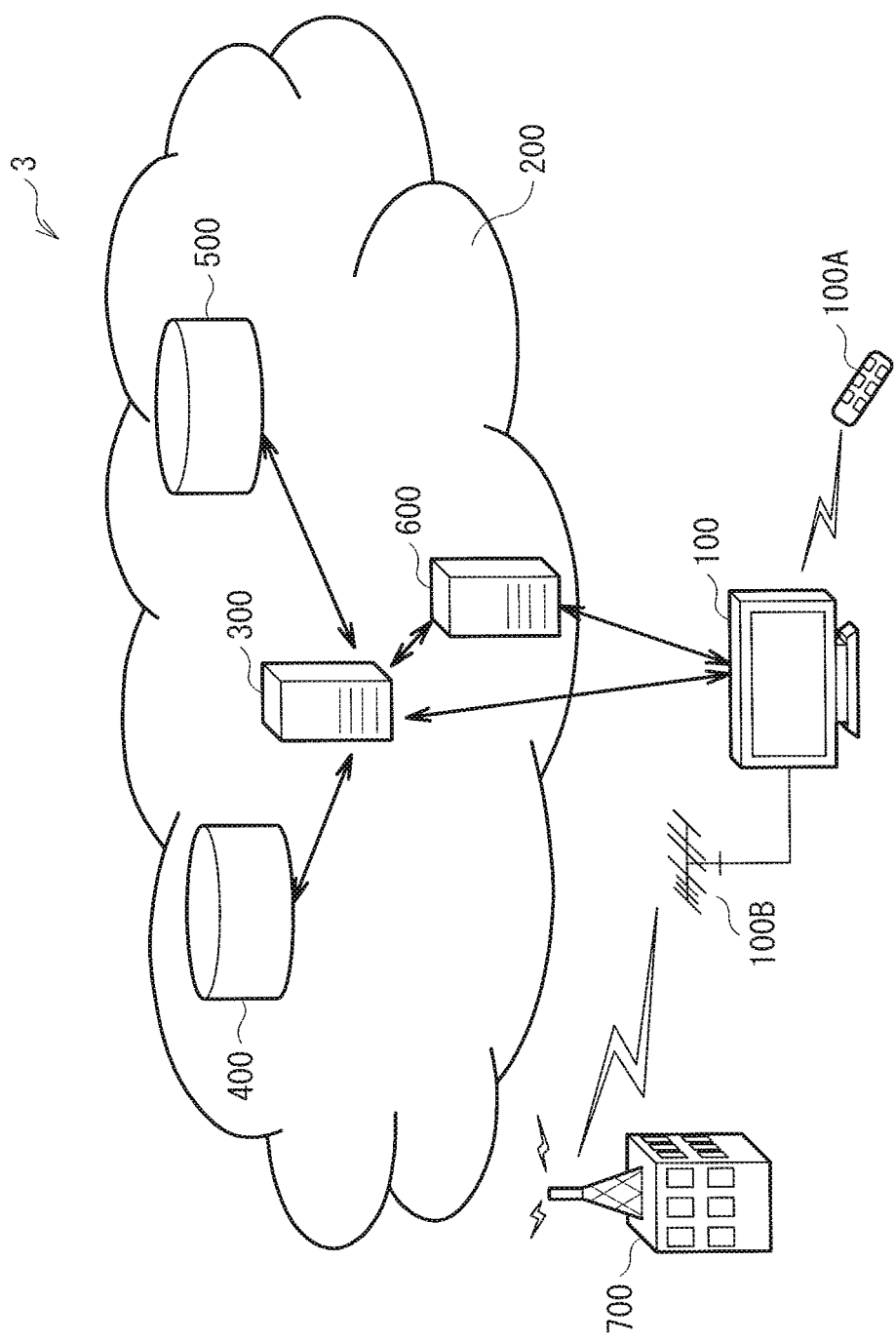
FIG. 18 is a diagram illustrating an example of a schematic configuration of a video display system according to a third embodiment of the present technology.

FIG. 18 illustrates an example of a schematic configuration of a video display system 3 according to a third embodiment of the present technology. The video display system 3 is a video display system that is configured so that the video display unit 100 is allowed to acquire content also from the broadcast station 700 in the video display system 1. The video display system 3 may include, for example, the video display unit 100, the information processing unit 300, the content storage unit 400, the data storage unit 500, the distribution server 600, and the broadcast station 700. The video display unit 100 includes the antenna 100B that receives a television broadcast signal from the broadcast station 700. The television broadcast signal may include, for example, the video content data Id and the content attribute data Ad.

In the present embodiment, when the content is acquired from the network 200, the parameter Pp that determines image quality or the related data related thereto is derived, in the information processing unit 300, from the specific information 130 received from the video display unit 100. The related data may specifically be the processed content data Id', or a set of the video content data Id and the metadata Md. The derived parameter Pp or the related data related thereto is transmitted from the information processing unit 300 to the video display unit 100. Also, in the present embodiment, when the content is acquired from the television broadcast signal, the parameter Pp that determines image quality is derived, in the information processing unit 300, from the specific information 130 received from the video display unit 100. The derived parameter Pp is transmitted from the information processing unit 300 to the video display unit 100. It is thus possible to cause the external unit to perform the information process, which puts a load thereon, necessary for achieving a video having appropriate image quality. As a result, it is possible to achieve the video having the appropriate image quality while suppressing increase in manufacturing cost of the video display unit 100.

6. Fourth Embodiment

Configuration

Figure 19:
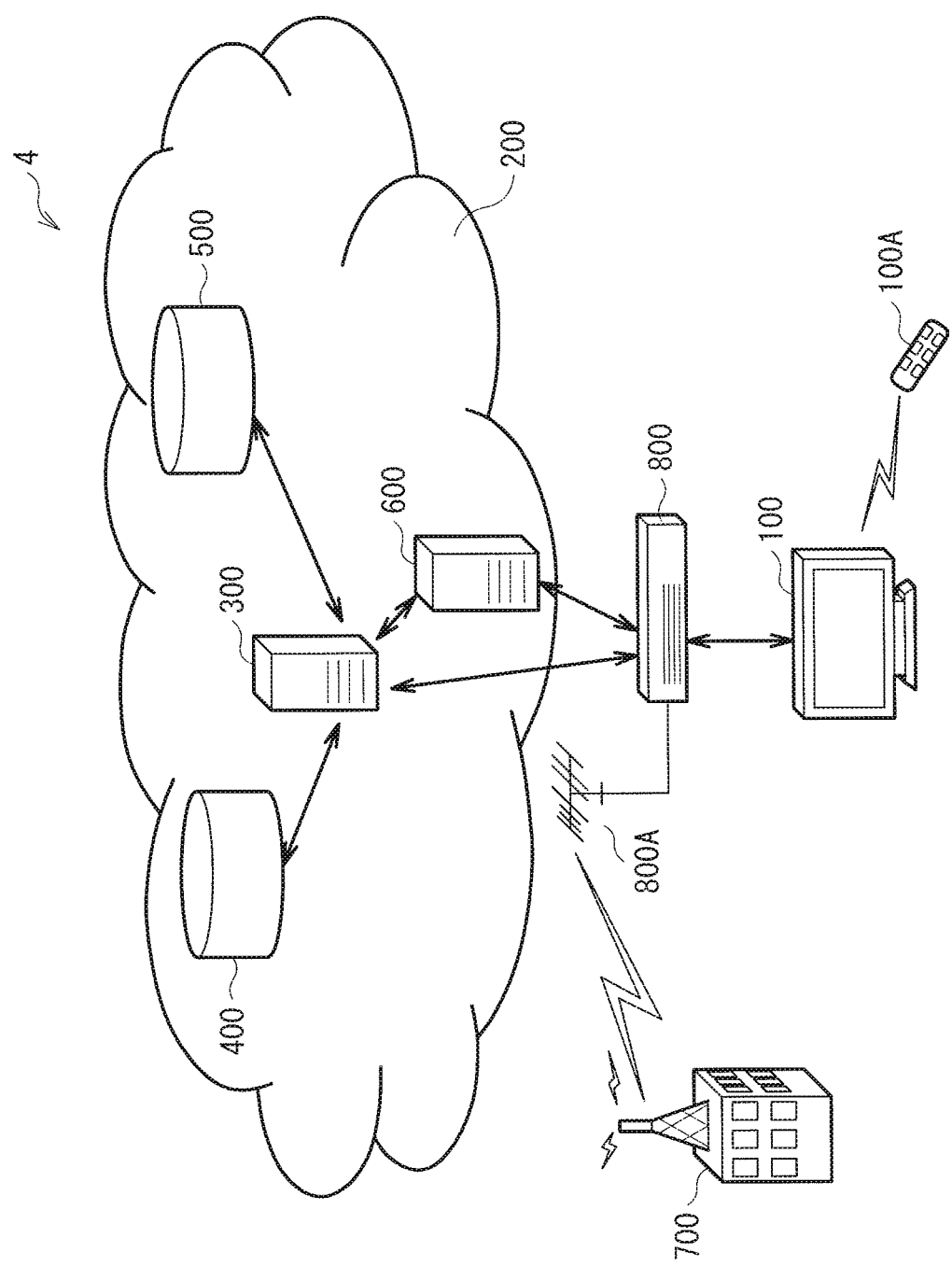
FIG. 19 is a diagram illustrating an example of a schematic configuration of a video display system according to a fourth embodiment of the present technology.

FIG. 19 illustrates an example of a schematic configuration of a video display system 4 according to a fourth embodiment of the present technology. The video display system 4 corresponds to a video display system in which a set top box 800 is provided between the video display unit 100 and the information processing unit 300 in the video display system 3.

Figure 20:
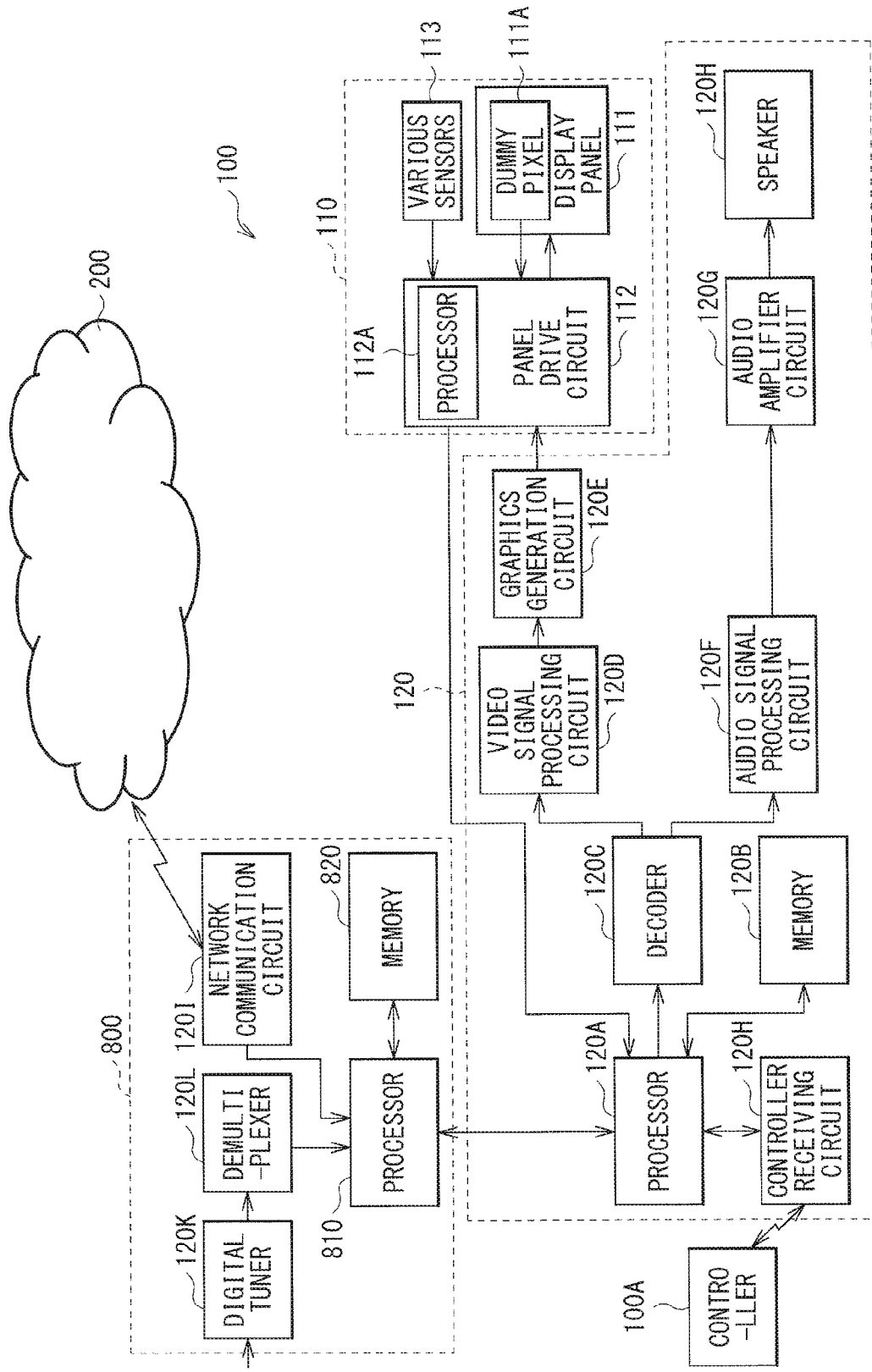
FIG. 20 is a diagram illustrating an example of an inner configuration of a video display unit and a set top box illustrated in FIG. 19.

FIG. 20 illustrates an example of an inner configuration of the video display unit 100 and the set top box 800. The set top box 800 may include, for example, a processer 810, the digital tuner 120K, the demultiplexer 120L, the network communication circuit 120I, and a memory 820. On the other hand, the video display unit 100 corresponds to a video display unit in which the digital tuner 120K, the demultiplexer 120L, and the network communication circuit 120I are omitted in the video display unit 100 in the third embodiment. The processor 810 may store the partial TS obtained by the demultiplexer 120L in the memory 820, or may transmit the partial TS read from the memory 820 to the decoder 120C via the processor 120A in the video display unit 100.

In the present embodiment, when the content is acquired from the network 200, the parameter Pp that determines image quality or the related data related thereto is derived, in the information processing unit 300, from the specific information 130 received from the video display unit 100. The related data may be specifically the processed content data Id', or a set of the video content data Id and the metadata Md. The derived parameter Pp or the related data related thereto is transmitted from the information processing unit 300 to the video display unit 100 via the set top box 800. Also, in the present embodiment, when the content is acquired from the television broadcast signal, the parameter Pp that determines image quality is derived, in the information processing unit 300, from the specific information 130 received from the video display unit 100. The derived parameter Pp is transmitted from the information processing unit 300 to the video display unit 100 via the set top box 800. It is thus possible to cause the external unit to perform the information process, which puts a load thereon, necessary for achieving a video having appropriate image quality. As a result, it is possible to achieve the video having the appropriate image quality while suppressing increase in manufacturing cost of the video display unit 100.

7. Modification Common to Embodiments

Figure 21:
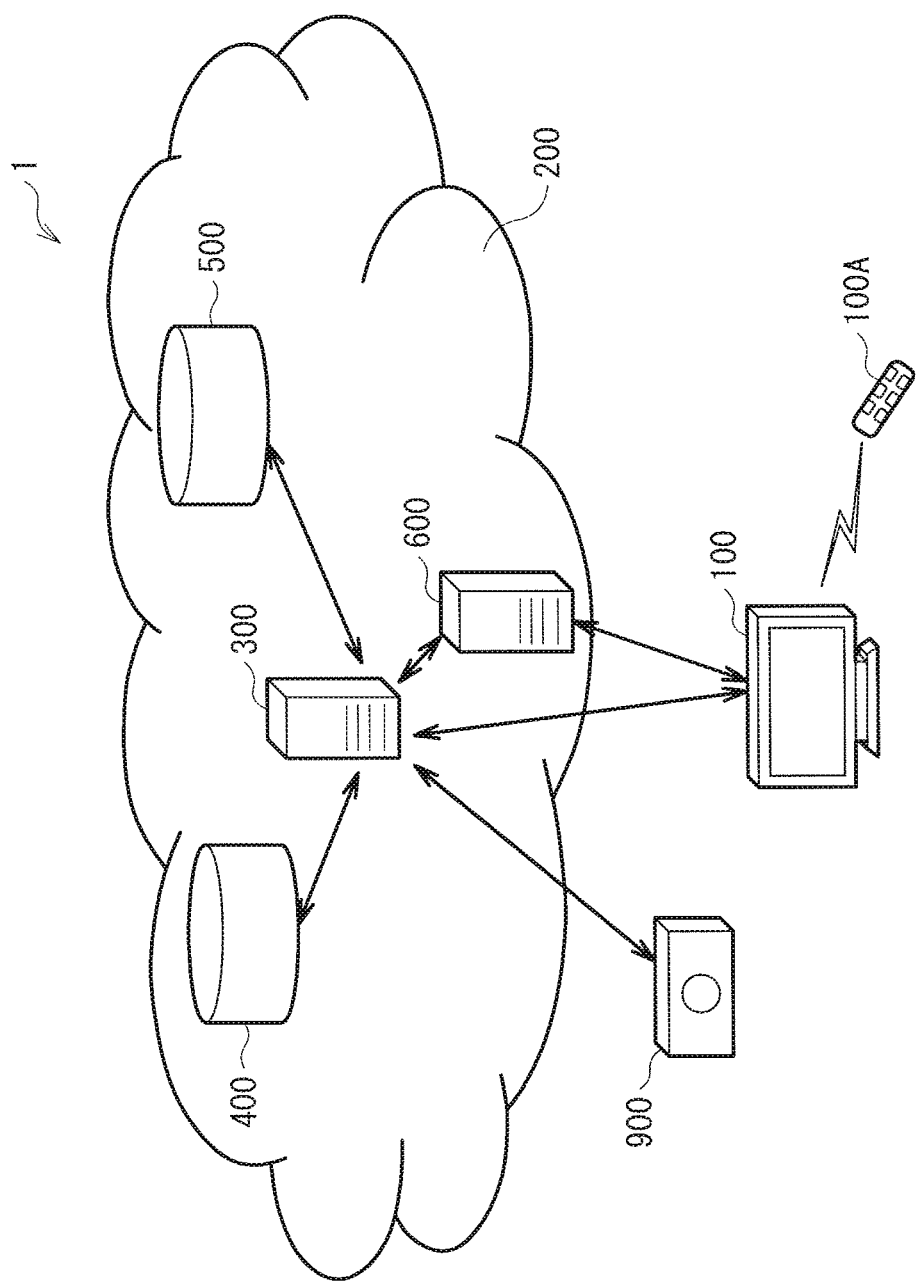
FIG. 21 is a diagram illustrating a modification of the schematic configuration of the video display system illustrated in FIG. 1.
Figure 22:
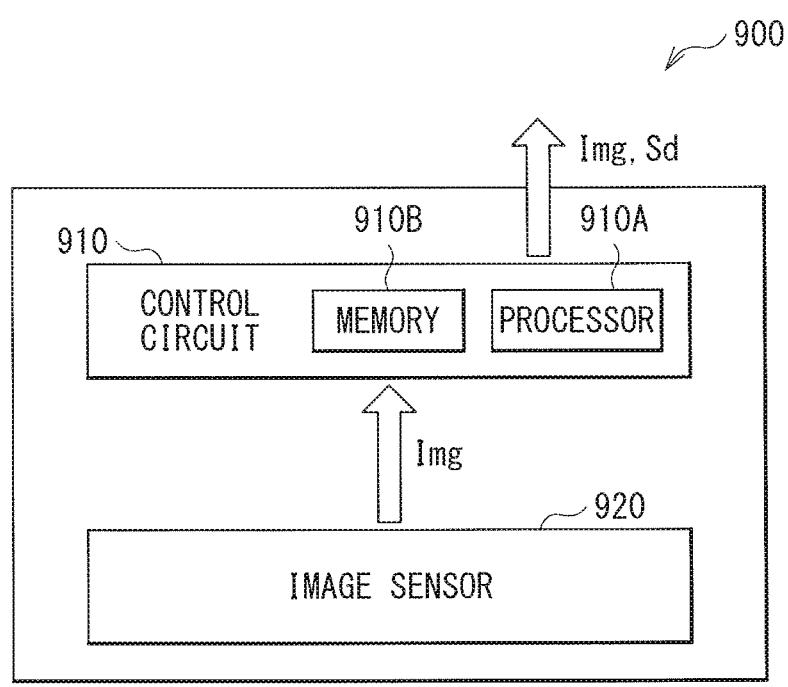
FIG. 22 is a diagram illustrating an example of an inner configuration of an imaging unit illustrated in FIG. 21.

As illustrated in FIG. 21, for example, an imaging unit 900 may be connected to the network 200 in the above-described embodiments and the modifications thereof. As illustrated in FIG. 22, the imaging unit 900 may include, for example, an image sensor 920, and a control circuit 910 that controls the image sensor 920. The control circuit 910 controls the image sensor 920, and may store imaging data Img obtained by the image sensor 920 in a memory 910B together with content attribute data Sd, or may output the imaging data Img to outside (the information processing unit 300). The content attribute data Sd may include the following data, for example.
(1) Producer of the video content data Id
(2) Production date and time of the video content data Id
(3) Kind (genre) of the video content data Id
(4) Recommended image quality of the video content data Id
(5) Resolution and frequency of the video content data Id
(6) Codec used for encoding the content
In a case where the video content data Id is a video shot by an imaging unit
(7) Manufacturer of camera, item number of camera, and item number of lens
(8) F-number, exposure time, ISO speed, exposure correction, focal length, maximum aperture stop, sidelight mode, subject distance, presence or absence of flash, light amount of flash, and shooting angle of view
(9) Illumination upon shooting, color temperature of illumination, and luminance upon subject reflectance of 100%

The information processing unit 300 analyses the content attribute data Sd, and derives a setting range of image quality preferable for the respective contents. The information processing unit 300 utilizes at least the display panel information Pd out of the display panel information Pd, the user information Ud, the environment information Ed, and the content attribute data Sd to derive a preferable setting range of image quality and a preferable control range of the display device, thereby deriving the parameter Pp.

When the imaging data Img has a format that is allowed to be subjected to an information process in the information processing unit 300, the information processing unit 300 may generate the processed content data Id' by processing the imaging data Img with the use of the parameter Pp derived from the specific information 130. Further, when the content attribute data Sd has been originally attached to the imaging data Img, the information processing unit 300 may generate the processed content data Id' by processing the imaging data Img with the use of the content attribute data Sd, and the parameter Pp derived from the specific information 130. When the information processing unit 300 has generated the processed content data Id', the information processing unit 300 transmits the processed content data Id' to the video display unit 100.

Even when the imaging data Img has the format that is allowed to be subjected to an information process in the information processing unit 300, the information processing unit 300 may not process the imaging data Img with the use of the parameter Pp derived from the specific information 130. In this case, the information processing unit 300 may set the parameter Pp as the metadata Md related to the imaging data Img. In this case, the metadata Md is the parameter Pp. Further, when the content attribute data Sd has been originally attached to the imaging data Img, the information processing unit 300 may set the parameter Pp and the content attribute data Sd as the metadata Md. In this case, the metadata Md is the parameter Pp and the content attribute data Sd. When the information processing unit 300 has generated the metadata Md, the information processing unit 300 transmits, to the video display unit 100, the imaging data Img together with the metadata Md.

When the imaging data Img does not have the format that is allowed to be subjected to an information process in the information processing unit 300, the information processing unit 300 does not process the imaging data Img with the use of the parameter Pp derived from the specific information 130. In this case, the information processing unit 300 may set the parameter Pp as the metadata Md related to the imaging data Img. In this case, the metadata Md is the parameter Pp. Further, when the content attribute data Sd has been originally attached to the imaging data Img, the information processing unit 300 may set the parameter Pp and the content attribute data Sd as the metadata Md. In this case, the metadata Md is the parameter Pp and the content attribute data Sd. When the information processing unit 300 has generated the metadata Md, the information processing unit 300 transmits, to the video display unit 100, the imaging data Img together with the metadata Md.

It is to be noted that the method of displaying a video on the display panel 111 in the video display system 1 is similar to that in the above-described first embodiment.

In the present modification, as in the above-described first embodiment, the parameter Pp that determines image quality or the related data related thereto is derived, in the information processing unit 300, from the specific information 130 received from the video display unit 100. The derived parameter Pp or the related data related thereto is transmitted from the information processing unit 300 to the video display unit 100. It is thus possible to cause the external unit (the information processing unit 300, the content storage unit 400, the data storage unit 500, and the distribution server 600) to perform the information process, which puts a load thereon, necessary for achieving a video having appropriate image quality. As a result, it is possible to achieve the video having the appropriate image quality while suppressing increase in manufacturing cost of the video display unit 100.

The present technology has been described above referring to some embodiments and modifications thereof. However, the present technology is not limited to the above-described embodiments and the like, and various modifications may be made. It is to be noted that the effects described herein are mere examples. The effects of the present technology are not limited to the effects described herein. The present technology may have an effect other than the effects described herein.

It is possible to achieve at least the following configurations from the above-described example embodiments and the modifications of the disclosure.

(1)
A video display system including:
a video display unit; and
an external unit configured to be communicatable with the video display unit,
the video display unit including a display panel and configured to transmit specific information to the external unit, the specific information including display panel information related to the display panel, and
the external unit being configured to derive a parameter from the specific information received from the video display unit and to transmit, to the video display unit, one of the derived parameter and related data related to the derived parameter, the parameter determining image quality.

(2)
The video display system according to (1), wherein the video display unit includes a sensor and generates the display panel information based on an output from the sensor, the sensor being configured to detect one or more of electric characteristics, optical characteristics, and environment of the display panel.

(3)
The video display system according to (2), wherein
the external unit includes
a content storage unit configured to store content data,
a data storage unit configured to store the parameter,
an information processing unit configured to perform one of an operation of processing the content data with use of the parameter and thereby generating processed content data, and an operation of generating metadata as the related data, the metadata being additional data of the content data and including the parameter, and
a distribution server configured to perform one of an operation of distributing the processed content data to the video display unit, and an operation of distributing, to the video display unit, the content data together with the metadata.

(4)
The video display system according to (3), wherein
the content data includes video content data and content attribute data, and
the information processing unit performs one of an operation of processing the video content data with use of the parameter and the content attribute data and thereby generating the processed content data, and an operation of generating the metadata as the related data, the metadata being additional data of the video content data and including the parameter and the content attribute data.

(5)
The video display system according to (3), wherein the video display unit performs one of an operation of displaying, on the display panel, a video based on the processed content data, and an operation of displaying, on the display panel, a video based on the content data while controlling the display panel based on the metadata.

(6)
The video display system according to any one of (1) to (5), wherein the specific information further includes user information.

(7)
The video display system according to any one of (1) to (6), wherein
the video display unit includes
a system circuit configured to decode one of the processed content data and the content data, and then to perform an image process thereon, and
a panel drive circuit configured to drive the display panel and to transmit the specific information to the external unit.

(8)
An external unit including:
a receiving section configured to receive specific information from a
video display unit, the video display unit including a display panel, and the specific information including display panel information related to the display panel;
an arithmetic section configured to derive one of a parameter and related data related to the parameter from the specific information received by the receiving section, the parameter determining image quality; and
a transmitting section configured to transmit, to the video display unit, one of the parameter and the related data derived by the arithmetic section.

(9)
The external unit according to (8), further including:
a content storage unit configured to store content data;
a data storage unit configured to store the parameter;
an information processing unit including the receiving section, the arithmetic section, and the transmitting section, the arithmetic section being configured to perform one of an operation of processing the content data with use of the parameter derived from the specific information and thereby generating processed content data, and an operation of generating metadata as the related data, the metadata being additional data of the content data and including the parameter; and
a distribution server configured to perform one of an operation of distributing the processed content data to the video display unit, and an operation of distributing, to the video display unit, the content data together with the metadata.

(10)
A method of displaying a video, the method including
receiving specific information from a video display unit,
deriving one of a parameter and related data related to the parameter from the received specific information, and transmitting, to the video display unit, one of the derived parameter and the related data, the video display unit including a display panel, the specific information including display panel information related to the display panel, and the parameter determining image quality.

It should be understood by those skilled in the art that various modifications, combinations, sub-combinations, and alterations may occur depending on design requirements and other factors insofar as they are within the scope of the appended claims or the equivalents thereof.

What is claimed is:

1. A video display system comprising:
a video display unit; and
an external unit configured to communicate with the video display unit,
the video display unit including a display panel and configured to transmit specific information to the external unit, the specific information including display panel information related to the display panel, and
the external unit being configured to derive a parameter from the specific information received from the video display unit and to transmit, to the video display unit, one of the parameter and related data that is related to the parameter, the parameter determining image quality,
wherein the video display unit includes a sensor and is configured to generate the display panel information based on an output from the sensor, the sensor being configured to detect one or more of electric characteristics, optical characteristics, and environment of the display panel, and
wherein the external unit includes:
at least one memory configured to store content data and the parameter;
an information processing unit configured to perform one of an operation of processing the content data with use of the parameter and thereby generating processed content data, and an operation of generating metadata as the related data, the metadata being additional data of the content data and including the parameter; and
a distribution server configured to perform one of an operation of distributing the processed content data to the video display unit, and an operation of distributing, to the video display unit, the content data together with the metadata.

2. The video display system according to claim 1, wherein the content data includes video content data and content attribute data, and
the information processing unit performs one of an operation of processing the video content data with use of the parameter and the content attribute data and thereby generating the processed content data, and an operation of generating the metadata as the related data, the metadata being additional data of the video content data and including the parameter and the content attribute data.

3. The video display system according to claim 1, wherein the video display unit performs one of an operation of displaying, on the display panel, a video based on the processed content data, and an operation of displaying, on the display panel, a video based on the content data while controlling the display panel based on the metadata.

4. The video display system according to claim 1, wherein the specific information further includes user information.

5. The video display system according to claim 1, wherein the video display unit includes
a system circuit configured to decode one of the processed content data and the content data, and then to perform an image process thereon, and
a panel drive circuit configured to drive the display panel and to transmit the specific information to the external unit.

6. An external unit comprising:
a receiving section configured to receive specific information from a video display unit, the video display unit including a display panel, and the specific information including display panel information related to the display panel;
an arithmetic section configured to derive one of a parameter and related data that is related to the parameter from the specific information received by the receiving section, the parameter determining image quality;
a transmitting section configured to transmit, to the video display unit, one of the parameter and the related data derived by the arithmetic section;
at least one memory for storing content data and the parameter;
an information processing unit including the receiving section, the arithmetic section, and the transmitting section, the arithmetic section being configured to perform one of an operation of processing the content data with use of the parameter derived from the specific information and thereby generating processed content data, and an operation of generating metadata as the related data, the metadata being additional data of the content data and including the parameter; and
a distribution server configured to perform one of an operation of distributing the processed content data to the video display unit, and an operation of distributing, to the video display unit, the content data together with the metadata.

* * * * *